US012713025B2

(12) United States Patent
Sosulnikov et al.

(10) Patent No.: US 12,713,025 B2
(45) Date of Patent: Aug. 18, 2026

(54) GAUSSIAN MIXTURE MODEL ENTROPY CODING

(71) Applicant: HUAWEI TECHNOLOGIES CO., LTD., Shenzhen (CN)

(72) Inventors: Mikhail Vyacheslavovich Sosulnikov, Munich (DE); Sergey Yurievich Ikonin, Moscow (RU); Andrey Soroka, Munich (DE); Elena Alexandrovna Alshina, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/749,362

(22) Filed: Jun. 20, 2024

(65) Prior Publication Data

US 2024/0340425 A1 Oct. 10, 2024

Related U.S. Application Data

(63) Continuation of application No. PCT/RU2021/000587, filed on Dec. 21, 2021.

(51) Int. Cl.
*H04N 19/13* (2014.01)
*H04N 19/103* (2014.01)
(Continued)

(52) U.S. Cl.
CPC ........... *H04N 19/13* (2014.11); *H04N 19/103* (2014.11); *H04N 19/136* (2014.11); *H04N 19/184* (2014.11)

(58) Field of Classification Search
CPC .... H04N 19/103; H04N 19/13; H04N 19/136; H04N 19/184; H04N 19/91
(Continued)

(56) References Cited

U.S. PATENT DOCUMENTS

2013/0282383 A1* 10/2013 Hedelin ................ G10L 19/035 704/200
2020/0027247 A1 1/2020 Minnen et al.
(Continued)

FOREIGN PATENT DOCUMENTS

WO 2021220008 A1 11/2021

OTHER PUBLICATIONS

Sun et al., "Image Compression Using GMM Model Optimization," IEEE International Conference on Acoustics, Speech, and Signal Processing, Total 5 pages (May 2019).
(Continued)

*Primary Examiner* — Christopher S Kelley
*Assistant Examiner* — Ana Picon-Feliciano
(74) *Attorney, Agent, or Firm* — Leydig, Voit & Mayer, Ltd.

(57) ABSTRACT

The present disclosure provides a method of decoding an encoded signal. The method includes receiving at least one bitstream comprising an encoded signal, the signal being entropy encoded with one or more Gaussian mixture models (GMMs), and the at least one bitstream comprising information for obtaining parameters of the one or more GMMs. The method further includes obtaining the GMM parameters based on the information from the at least one bitstream; and entropy decoding the signal using the GMMs with the obtained GMM parameters. The present disclosure further refers to a corresponding encoding method, decoder and encoder.

22 Claims, 8 Drawing Sheets

(51) Int. Cl.
*H04N 19/136* (2014.01)
*H04N 19/184* (2014.01)

(58) Field of Classification Search
USPC .................................................... 375/240.02
See application file for complete search history.

(56) References Cited

U.S. PATENT DOCUMENTS

2020/0107023 A1* 4/2020 Lee ...................... H04N 19/196
2021/0152831 A1 5/2021 Liu et al.

OTHER PUBLICATIONS

Minnen et al.,"Joint Autoregressive and Hierarchical Priors for Learned Image Compression," arXiv:1809.02736v1 [cs.CV], Total 22 pages (Sep. 2018).
Bross et al., "Versatile Video Coding (Draft 10)," Joint Video Experts Team (JVET) of ITU-T SG 16 WP 3 and ISO/IEC JTC 1/SC 29/WVG 11, JVET-S2001-v, Total 548 pages (Jun. 22-Jul. 1, 2020).
Cheng et al., "Learned Image Compression with Discretized Gaussian Mixture Likelihoods and Attention Modules," arXiv:2001.01568v3, Total 15 pages (Mar. 2020).
Shannon, "A Mathematical Theory of Communication," Total 14 pages (Feb. 2000).
Gersho et al., "Vector Quantization and Signal Compression," Kluwer Academic Publishers, total 6 pages (1992).
Wintz, "Transform Picture Coding," Proceedings of the IEEE vol. 60, No. 7, Total 18 pages (Jul. 1972).
Netravali et al., "Picture Coding: A Review," Proceedings of the IEEE vol. 68, No. 3, Total 48 pages (Mar. 1980).
Balle et al., "End-to-end Optimized Image Compression," Published as a conference paper ICLR 2017, Total 27 pages (Mar. 2017).
Balle et al., "Density Modeling of Images Using a Generalized Normalization Transformation," Published as a conference paper at ICLR 2016, Total 14 pages (Feb. 2016).
Kingma et al., "Auto-Encoding Variational Bayes," arXiv: 1312.611v10 [stat.ML], Total 14 pages (May 2014).
Rezende et al., "Appendices: Stochastic Backpropagation and Approximate Inference in Deep Generative Models," Proceedings of the 31st International Conference on Machine Learning Total 5 pages (Last revised May 2014).
Wiegand et al., "Overview of the H.264/AVC video coding standard," IEEE Transactions on Circuits and Systems for Video Technology, vol. 13, No. 7, Total 17 pages, Institute of Electrical and Electronics Engineers, New York, New York (Jul. 2003).
Sullivan et al., "Overview of the high efficiency video coding (HEVC) standard," IEEE Transactions on Circuits and Systems for Video Technology, vol. 22, No. 12, Total 20 pages (Dec. 2012).
Bross et al., "Versatile Video Coding (Draft 7)," Joint Video Experts Team (JVET) of ITU-T SG 16 WP 3 and ISO/IEC JTC 1/SC 29/WG 11, JVET-P2001vE, Total 494 pages (Oct. 1-11, 2019).
Choi et al., "Near-Lossless Deep Feature Compression for Collaborative Intelligence," 2018 IEEE 20th International Workshop on Multimedia Signal Processing (MMSP), Vancouver, BC, Total 6 pages (Jun. 2018).
Kang et al., "Neurosurgeon: Collaborative intelligence between the cloud and mobile edge," Proc. 22nd ACM Int. Conf. Arch. Support Programming Languages and Operating Syst., Total 15 pages (Apr. 2017).
Eshratifar et al., "JointDNN: An efficient training and inference engine for intelligent mobile cloud computing services," arXiv preprint, arXiv: 1801.08618v2, Submitted 2018, Total 12 pages (Last Revised Feb. 2020).
Choi et al., "Deep feature compression for collaborative object detection," arXiv: 1802.03931v1 [cs. CV], Total 5 pages (Feb. 2018).
Redmon et al., "YOLO9000: Better, Faster, Stronger," Proceedings of the IEEE Conference on Computer Vision and Pattern Recognition, Total 9 pages (Jul. 2017).
Bossen et al., "HEVC Complexity and Implementation Analysis," IEEE Transactions on Circuits Systems for Video Technology, vol. 22, No. 12, Total 12 pages (Dec. 2012).
Luo et al., "DeepSIC: Deep semantic image compression," arXiv preprint, arXiv:1801.09468v1, Total 8 pages (Jan. 2018).
Marpe et al., "Context-based adaptive binary arithmetic coding in the H.264/AVC video compression standard," IEEE Transactions on Circuits Systems for Video Technology, vol. 13, No. 7, Total 17 pages (Jul. 2003).
"Cisco Visual Networking Index: Forecast and Methodology," CISCO, White Paper, Total 17 pages (Jun. 6, 2017).
Wu et al., "Compressed video action recognition," Computer Vision and Pattern Recognition, CVPR, Total 10 pages (Mar. 2018).
Han et al., "Deep compression: Compressing deep neural networks with pruning, trained quantization and huffman coding," arXiv preprint, arXiv:1510.00149v5, Submitted 2015, Total 14 pages (Last Revised Feb. 2016).
Sullivan et al., "Overview of the high efficiency video coding (HEVC) standard," TCSVT, IEEE Transactions on Circuits and Systems for Video Technology, vol. 22, No. 12, Total 20 pages (Dec. 2012).
Toderici et al., "Variable rate image compression with recurrent neural networks," Under review as a conference paper at ICLR 2016, arXiv:1511.06085v2 [cs.CV], Total 9 pages (Nov. 2015).
Toderici et al., "Full resolution image compression with recurrent neural networks," CVPR, Total 9 pages (Jul. 2017).
Agustsson et al., "Soft-to-Hard Vector Quantization for End-to-End Learned Compression of Images and Neural Networks," arXiv:1704.00648v1 [cs.LG], Total 15 pages (Apr. 2017).
Balle et al., "Variational image compression with a scale hyperprior," Published as a conference paper at ICLR 2015, arXiv preprint, arXiv:1802.01436v2, Total 23 pages (May 2018).
Johnston et al., "Improved lossy image compression with priming and spatially adaptive bit rates for recurrent networks," Computer Vision and Pattern Recognition, CVPR, Jun. 2018, Total 9 pages (May 2017).
Theis et al., "Lossy image compression with compressive autoencoders," arXiv preprint, arXiv: 1703.00395v1, Total 19 pages (Mar. 2017).
Li et al., "Learning convolutional networks for content-weighted image compression," Computer Vision and Pattern Recognition, CVPR, Total 10 pages (Jun. 2018).
Rippel et al., "Real-time adaptive image compression," ICML, arXiv:1705.05823v1 [stat. ML], Total 16 pages (May 2017).
Agustsson et al., "Generative adversarial networks for extreme learned image compression," Total 11 pages (Apr. 2018).
Wallace et al., "The JPEG still picture compression standard," IEEE Transactions on Consumer Electronics, Total 17 pages (Dec. 1991).
Skodras et al., "The JPEG 2000 still image compression standard," IEEE Signal Processing Magazine, Total 23 pages (Sep. 2001).
Bellarde et al., "BPG Image format," http://bellard.org/bpg/, Total 2 pages (Apr. 2018).
Xue et al., "Video enhancement with task-oriented flow," arXiv:1711.09078v3 [cs.CV], Total 20 pages (Nov. 2019).
Lu et al., "DVC: An End-to-end Deep Video Compression Framework," Proceedings of the IEEE/CVF Conference on Computer Vision and Pattern Recognition (CVPR), Total 10 pages (Last revised Apr. 2019).
Choi et al., "Text of ISO/IEC CD 23094-1, Essential Video Coding," ISO/IEC CD 23094-1, JTC1/SC29/WG11 N18568, Total 292 pages (Jul. 2019).
"Autoencoder," Wikipedia, Total 17 pages, https://en.wikipedia.org/wiki/Autoencoder (Sep. 2006).
"Normal distribution," Wikipedia, Total 26 pages,https://en.wikipedia.org/wiki/Normal_distribution (Feb. 2001).
"Convolutional neural network," Wikipedia, Total 42 pages,https://en.wikipedia.org/wiki/Convolutional_neural_network, Total 42 pages (Aug. 2013).

* cited by examiner receiving at least one bitstream comprising an entropy encoded signal, the signal being entropy encoded with one or more Gaussian mixture model (GMM), and the at least one bitstream comprising information for obtaining parameters of the one or more GMMs

110 obtaining the GMM parameters based on the information from the at least one bitstream

120 entropy decoding the signal using the GMMs with the obtained GMM parameters

Figure 1:
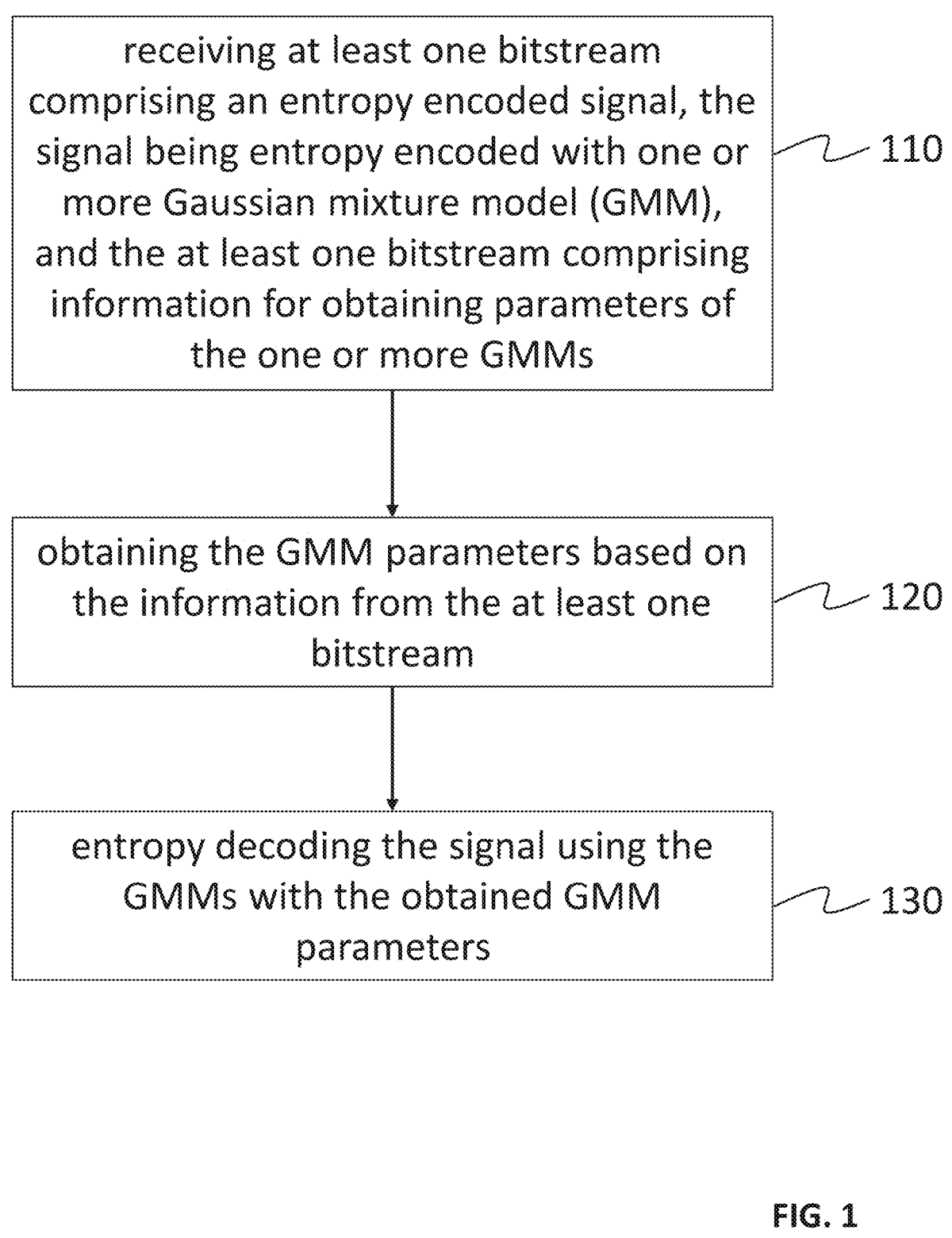

130

FIG. 1 entropy encoding a signal using one or more Gaussian mixture model (GMM) with determined GMM parameters

210 generating at least one bitstream comprising the entropy encoded signal and the determined GMM parameters

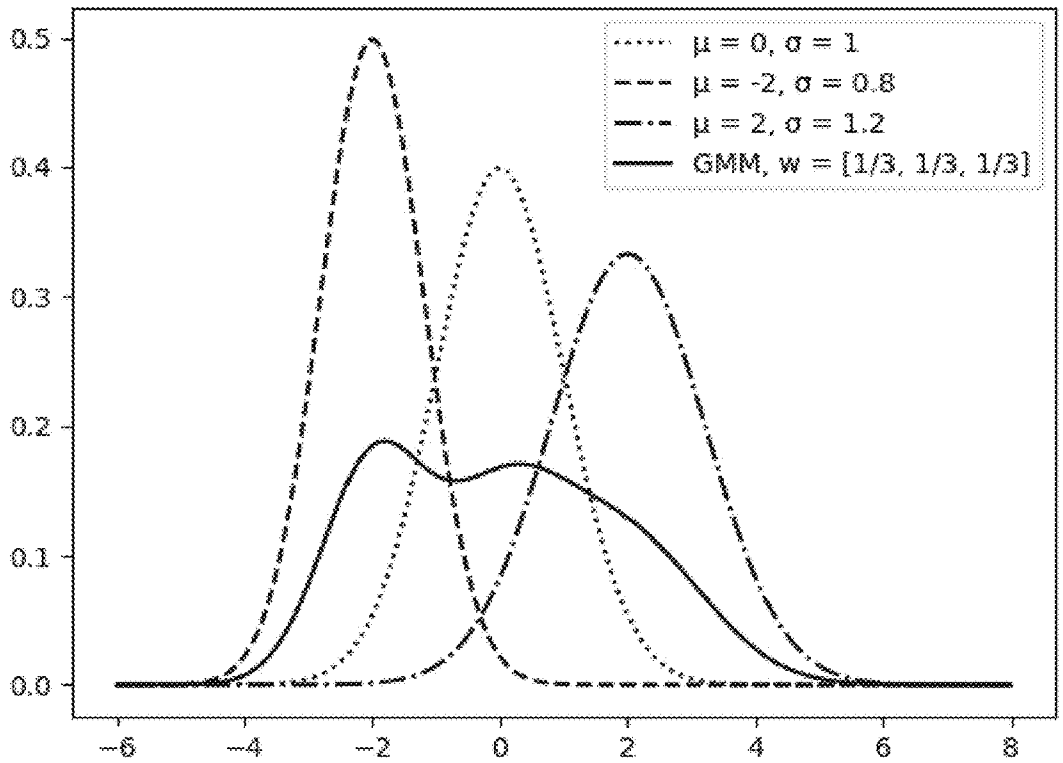
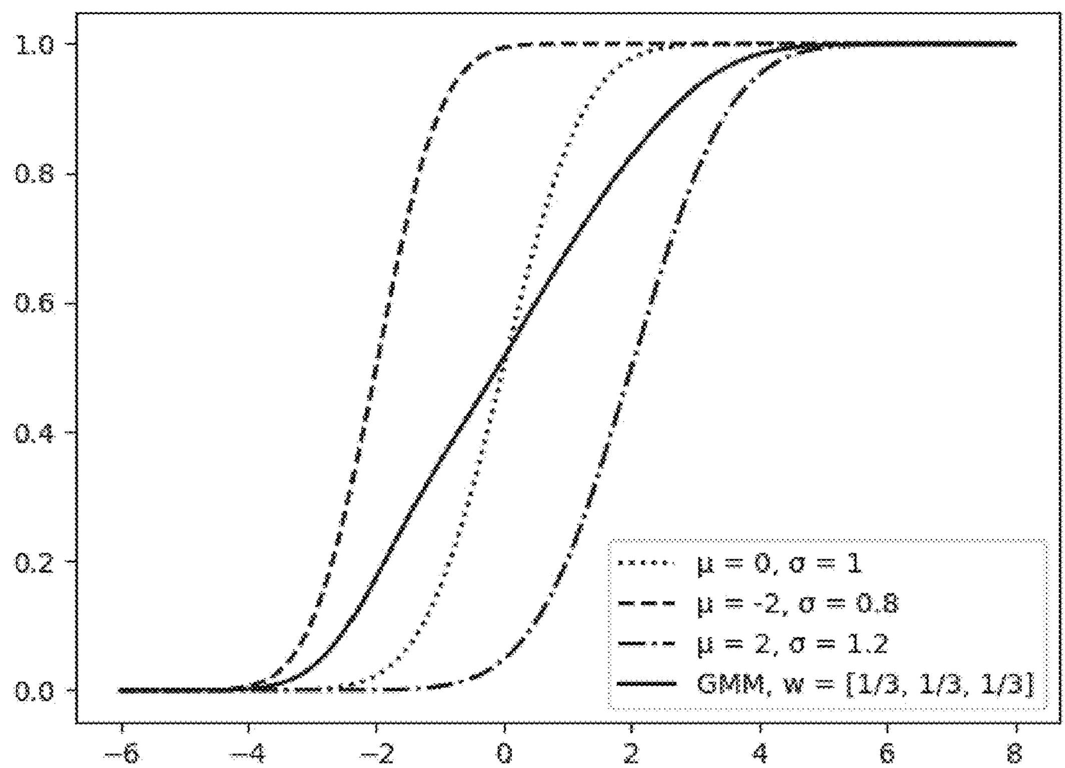
FIG. 3

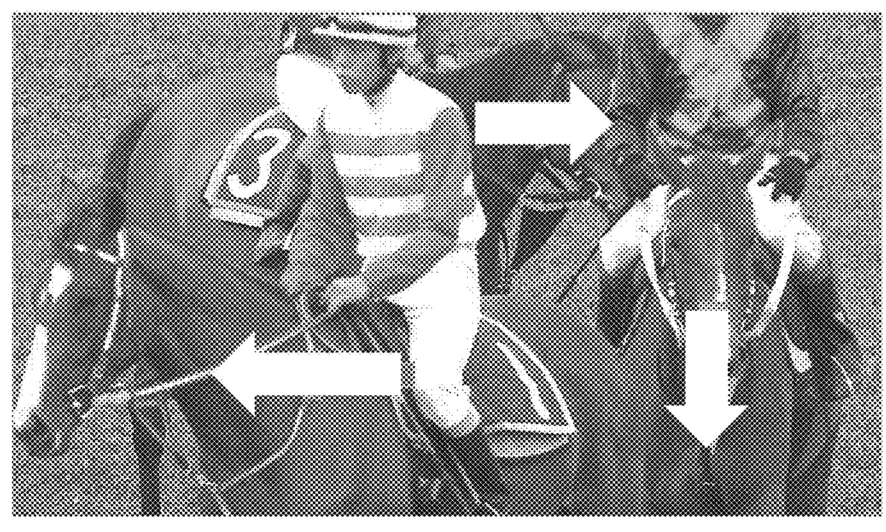
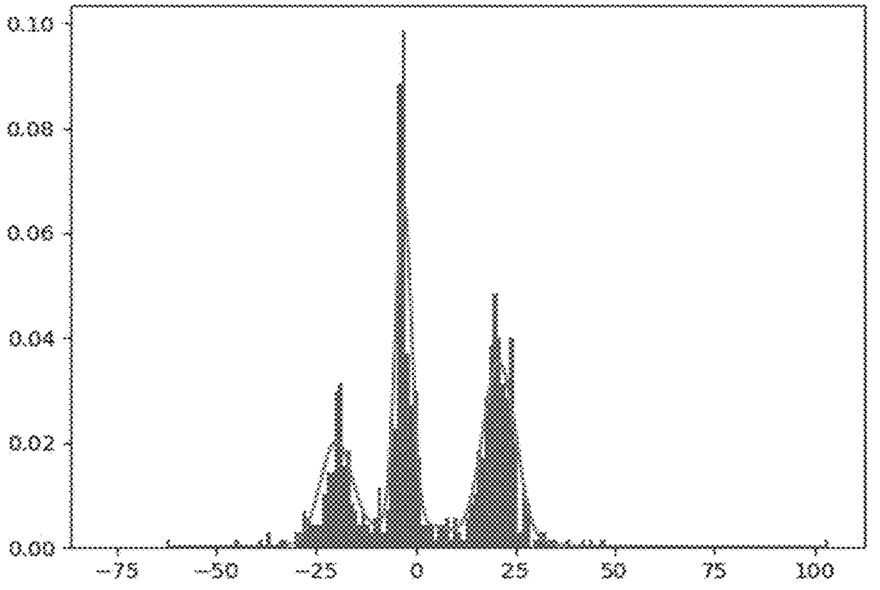
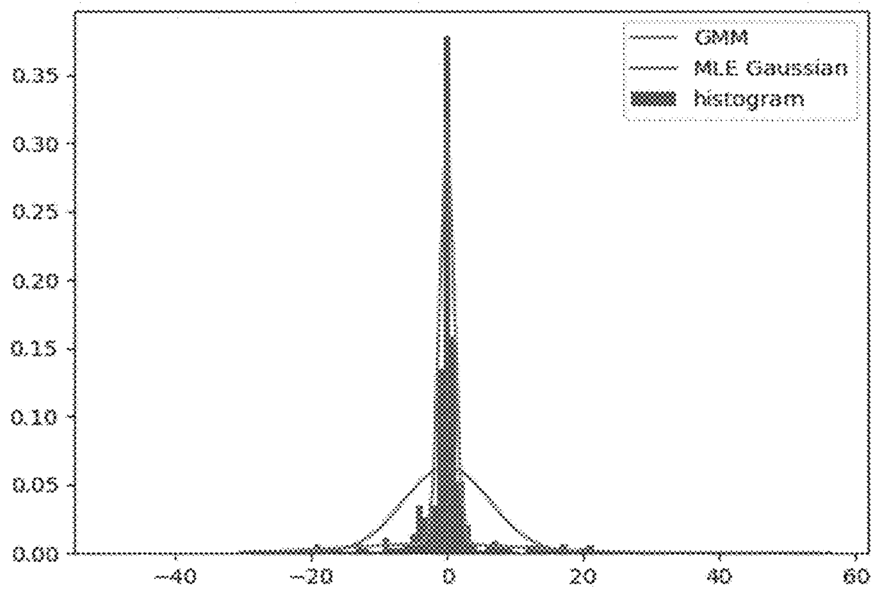
FIG. 4

GAUSSIAN MIXTURE MODEL ENTROPY CODING

CROSS-REFERENCE TO RELATED APPLICATIONS

This application is a continuation of International Application No. PCT/RU2021/000587, filed on Dec. 21, 2021, the disclosure of which is hereby incorporated by reference in its entirety.

TECHNICAL FIELD

The present disclosure relates to a method of decoding an entropy encoded signal, a method of entropy encoding a signal, and a corresponding decoder, encoder and bitstream.

BACKGROUND

Recent progress in artificial neural networks (NNs) and especially in convolutional neural networks opened the possibility of applying NN-based technologies to the task of image and video compression.

Entropy coding utilizes an entropy model (prior distribution) to encode and decode a signal.

In a Known Method the Following Steps are Used:

1. an NN architecture (encoder NN) is used to generate a latent representation of the data,
2. an NN architecture (hyper-encoder NN) is used for generation of a latent representation of an entropy model of a latent representation of the data, wherein the entropy model is defined by one or more probability distribution parameters characterizing one or more code symbol probability,
3. an NN architecture (entropy NN) generates parameters of the entropy model for coding the latent representation of the data depending on the latent representation of the entropy model processed by NN architecture (hyper-decoder NN) and the latent representation of the data itself processed by NN architecture (autoregressive context NN).

Using autoregressive context NN significantly increases a decoder runtime which is critical for real-time application. This is caused by the autoregressive operation of the model that processes sample by sample.

Further, an entropy model NN was suggested that provides GMM parameters for entropy coding a latent representation of the data. This approach specifies an entropy model NN, but the GMM parameters are not coded but obtained from a hyper-decoder NN. However, the number of Gaussians in the mixture is fixed and constrained by the pre-trained NN model, which limits the adaptivity of the model to the content.

A Gaussian Mixture Model (GMM) is used in the prior art for lossy image coding, using color components and position on a picture as dimensions of the GMM. Parameters are coded as a dictionary to avoid duplicated models for different blocks. However, this method does not use the GMM model for entropy coding of the signal.

In the Versatile Video Coding (VVC) standard, motion vector differences may be coded per block using Exponential-Golomb coding. This, however, limits the class of distributions that can be used for entropy coding, so the resulting number of bits is generally higher than Shannon entropy limit.

SUMMARY

In view of the above, the present disclosure provides a coding method that overcomes one or more of the above-mentioned disadvantages and provides an efficient entropy coding.

According to a first aspect, a method of decoding an encoded signal is provided, comprising the steps of receiving at least one bitstream comprising an entropy encoded signal, the signal being entropy encoded with one or more Gaussian mixture model (GMM), and the at least one bitstream comprising information for obtaining parameters of the one or more GMMs; obtaining the GMM parameters based on the information from the at least one bitstream; and entropy decoding the signal using the GMMs with the obtained GMM parameters.

The present disclosure provides a scheme of coding a signal using one or more GMM entropy models (which are fitted on the encoder side). The parameters of the one or more GMM entropy models are obtained from the bitstream on the decoder side. A parameter can be obtained directly from the respective information in the bitstream or can be derived from information obtained from the bitstream for other obtained parameters. This is an explicit way of signaling entropy model GMM parameters. A compression performance close to the Shannon limit can be achieved. A speed-up of the decoder can be realized compared with autoregressive modeling. Technical details of the parameters signaling are specified in the following description, in particular the description of the embodiments. Embodiments of the present disclosure may be applied in the technological fields of 2D/3D Image and Video Compression, Feature Map Coding, Variational Autoencoder (VAE) Applications, in particular motion information coding obtaining from VAE, 2D/3D image and video synthesis, and Video Coding for Machines, for example.

According to an implementation, the step of obtaining the GMM parameters may comprise: obtaining, from the at least one bitstream, control information for one or more of the GMM parameters; and processing the control information to entropy decode from the bitstream the one or more GMM parameters.

Accordingly, the decoder may read from the bitstream parsing and processing control parameters. The control information may relate to syntax elements defining a procedure of parameter parsing and processing and/or a mapping with signal channels and/or parameter value limits and/or total number of parameters.

According to an implementation, the control information may include at least one of (a) a GMM mode, indicating a relation between channels and a number of GMMs, in particular one of the following GMM modes: one GMM for each channel, one GMM for all channels, or a specific number of GMMs for all channels; (b) a number of GMMs; (c) one or more indices for mapping one or more channels to GMMs; (d) one or more modes of signaling a scale factor for a GMM parameter, each mode being one of a first mode indicating to use a predefined value of the scale factor, a second mode indicating that the scale factor is to be entropy decoded from the bitstream, and a third mode indicating that an exponent for a power of 2 of the scale factor is to be decoded from the bitstream; (c) one or more scaling coefficients for GMM parameters; (f) one or more modes of signaling a clipping value for a GMM parameter, each mode being one of a first mode indicating to use a predefined value of the clipping value, a second mode indicating that the clipping value is to be entropy decoded from the bitstream, and a third mode indicating that an exponent for a power of 2 of the clipping value is to be decoded from the bitstream; (g) one or more clipping values for GMM parameters; and (h) a number of Gaussians for each GMM.

The bitstream may include one or more signal channels and the control information GMM mode may relate a number of GMMs to the channels in the bitstream. The control information number of GMMs may specify a number of GMMs and a number of Gaussians in each GMM. In particular, the number of GMMs may be provided for the mode of a specific number of GMMs for all channels. The index or indices may map channels to GMMs. The control information may include one or more modes of signaling a scale factor for a GMM parameter, indicating how to obtain the scale factor. The control information may include one or more scaling coefficients (scale factors) for GMM parameters. Further, the control information may include a mode for signaling a clipping value and/or a clipping value. It is to be noted that different GMM parameters may have different modes for signaling the clipping value. For example, there may be two signaled clipping values for the mean value, one for the standard deviation, and none for the weight, or any other combination. This applies similarly to the scale factor for the GMM parameters. Different modes provide for different processing of parameters/values.

According to an implementation, the GMM parameters comprise for each Gaussian a mean value, a standard deviation, and/or a weight.

The mean value and the standard deviation define the form of each Gaussian in the GMM and the weight defines the relative portion of a particular Gaussian in the GMM. Each weight may be a number between 0 and 1, and the sum of all the weights in a GMM is 1. In view of this summation condition, it may not be necessary to signal all weights in the bitstream, since one of the weight can be calculated from the others.

According to an implementation, the method may comprise the further step of building signal frequency tables based on the decoded GMM parameters; wherein the step of entropy decoding the signal comprises using the signal frequency tables for decoding the signal.

The frequency tables are built on a range from minimum possible signal value −QS/2 to maximum possible signal value +QS/2, wherein QS stands for quantization step. The quantized samples have a quantization step QS. Each fold of frequency table on that range has length of QS value. The frequency table may be multiplied by coefficient determining precision of arithmetic codec and may be clipped with 1 or some other value at lower bound to guarantee absence of zero-probability symbols.

According to an implementation, the signal includes one or more channels and the step of entropy decoding the signal comprises entropy decoding each channel with a corresponding set of GMM parameters.

Accordingly, each channel may be decoded independently.

According to an implementation, the at least one bitstream includes a first bitstream comprising the entropy encoded signal and a second bitstream comprising the parameters of the GMM.

The advantage thereof is that the first bitstream cannot be decoded without the second bitstream having the GMM parameters, which thus serves a privacy protection. Alternatively, an encryption of only the GMM parameters and parameters parsing and processing information that are signaled in the bitstream may be applied. Thus, not all the bitstream is encrypted, but only a small part of it, with a speed-up of the encrypting and decrypting processes.

According to a second aspect a method of encoding a signal is provided, comprising the steps of entropy encoding the signal using one or more Gaussian mixture model (GMM) with determined GMM parameters; and generating at least one bitstream comprising the entropy encoded signal and the determined GMM parameters.

Further, the method may comprise a step of determining the GMM parameters.

The explanations and advantages provided above for the decoding method apply here vis-a-vis. In order to avoid repetition, these are omitted here and in the following.

According to an implementation, the method may further comprise setting control information for obtaining one or more of the determined GMM parameters; wherein the at least one bitstream comprises the control information.

According to an implementation, the control information may include at least one of (a) a GMM mode, indicating a relation between channels and a number of GMMs, in particular one of the following GMM modes: one GMM for each channel, one GMM for all channels, or a specific number of GMMs for all channels; (b) a number of GMMs; (c) one or more indices for mapping one or more channels to GMMs; (d) one or more modes of signaling a scale factor for a GMM parameter, each mode being one of a first mode indicating to use a predefined value of the scale factor, a second mode indicating that the scale factor is to be entropy decoded from the bitstream, and a third mode indicating that an exponent for a power of 2 of the scale factor is to be decoded from the bitstream; (e) one or more clipping values for GMM parameters; and (f) a number of Gaussians for each GMM.

According to an implementation, the GMM parameters may comprise for each Gaussian a mean value, a standard deviation, and/or a weight.

According to an implementation, the signal includes one or more channels and the step of entropy encoding the signal comprises entropy encoding each channel with a corresponding set of GMM parameters.

According to an implementation, the at least one bitstream may include a first bitstream comprising the entropy encoded signal and a second bitstream comprising the parameters of the GMM.

According to an implementation, the method may comprise the further step of performing an optimization algorithm using GMM cumulative distribution functions to obtain the determined GMM parameters.

According to an implementation, performing the optimization algorithm may comprise minimizing a loss function based on differences of the GMM cumulative distribution functions at step size intervals for each GMM.

According to an implementation, the optimization may be performed in parallel for GMMs with respective different numbers of Gaussians.

According to an implementation, a GMM may be selected from the optimized set of GMMs with different number of Gaussians having a minimum signaling cost with respect to the required bits in the bitstream.

According to a third aspect, a decoder for decoding an encoded signal is provided, the decoder comprising processing circuitry configured to perform the method of decoding an encoded signal according to the first aspect or any implementation form thereof.

According to the fourth aspect, an encoder for encoding a signal is provided, the encoder comprising processing circuitry configured to perform the method of encoding a signal according to the second aspect or any implementation form thereof.

According to a fifth aspect, a computer program is provided, comprising instructions which, when the program is executed by a computer, cause the computer to carry out the method of decoding an encoded signal according to the first aspect or any implementation form thereof, or the method of encoding a signal according to the second aspect or any implementation form thereof.

According to a sixth aspect, a computer-readable medium is provided, comprising instructions which, when executed by a computer, cause the computer to carry out the method of decoding an encoded signal according to the first aspect or any implementation form thereof, or the method of encoding a signal according to the second aspect or any implementation form thereof.

According to a seventh aspect, a bitstream is provided, the bitstream comprising an entropy encoded signal encoded with one or more Gaussian mixture model (GMM); and GMM parameters.

According to an implementation, the bitstream may comprise control information for one or more of the GMM parameters.

According to an implementation, the control information may include at least one of (a) a GMM mode, indicating a relation between channels and a number of GMMs, in particular one of the following GMM modes: one GMM for each channel, one GMM for all channels, or a specific number of GMMs for all channels; (b) a number of GMMs; (c) one or more indices for mapping one or more channels to GMMs; (d) one or more modes of signaling a scale factor for a GMM parameter, each mode being one of a first mode indicating to use a predefined value of the scale factor, a second mode indicating that the scale factor is to be entropy decoded from the bitstream, and a third mode indicating that an exponent for a power of 2 of the scale factor is to be decoded from the bitstream; (e) one or more scaling coefficients for GMM parameters; (f) one or more modes of signaling a clipping value for a GMM parameter, each mode being one of a first mode indicating to use a predefined value of the clipping value, a second mode indicating that the clipping value is to be entropy decoded from the bitstream, and a third mode indicating that an exponent for a power of 2 of the clipping value is to be decoded from the bitstream; (g) one or more clipping values for GMM parameters; and (h) a number of Gaussians for each GMM.

According to an implementation, the GMM parameters may comprise for each Gaussian a mean value, a standard deviation, and/or a weight.

BRIEF DESCRIPTION OF THE DRAWINGS

In the following, embodiments of the present disclosure are described in more detail with reference to the attached FIGURES and drawings, in which:

FIG. 1 illustrates a method of decoding an encoded signal.

Figure 2:
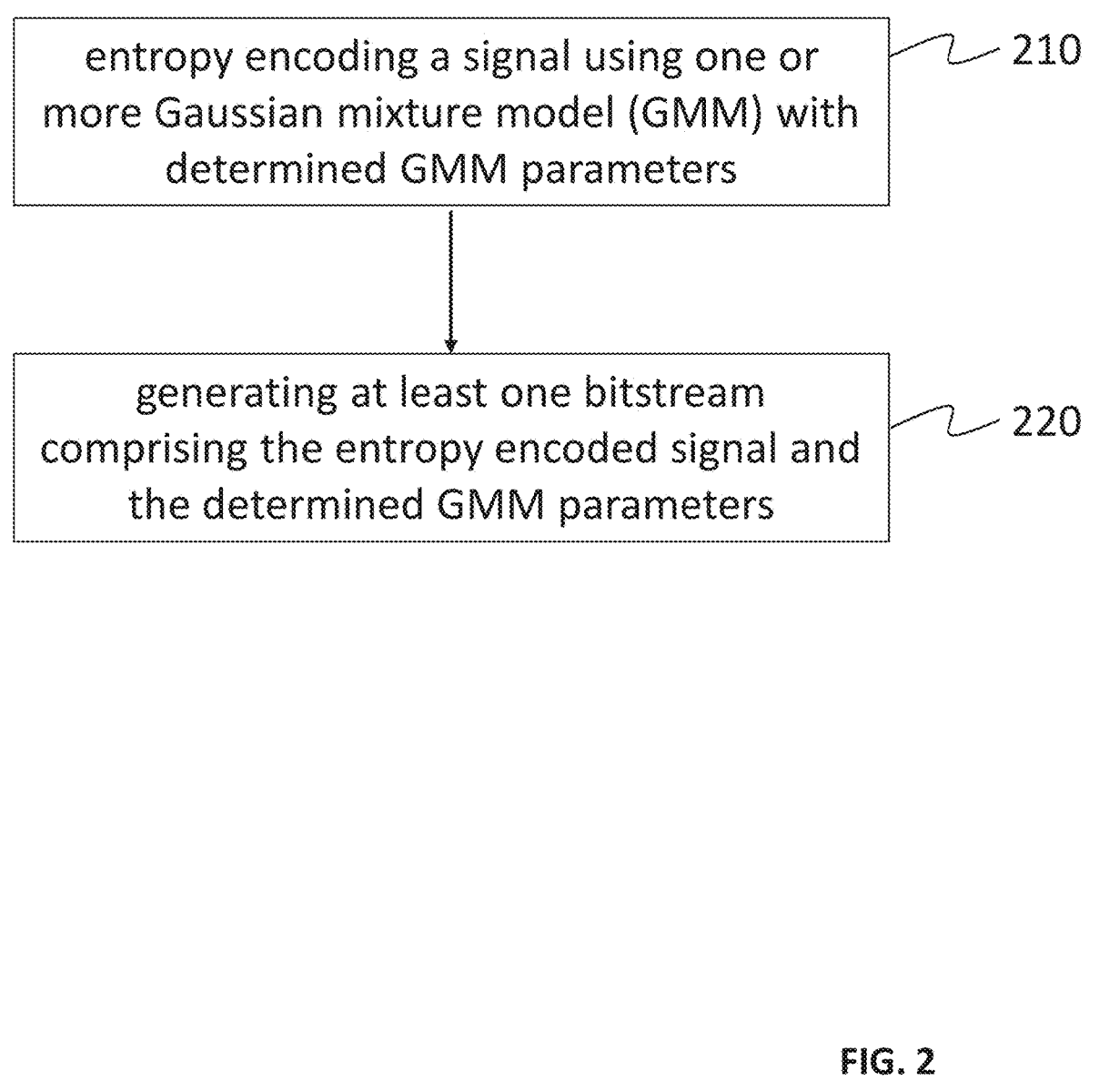

FIG. 2 illustrates a method of encoding a signal.

FIG. 3 illustrates Gaussian distribution functions and corresponding cumulative Gaussian distribution functions.

FIG. 4 illustrates the use of Gaussians in the context of motion vectors, and specifically:

1. FIG. 4A illustrates a picture with arrows showing how objects are moving in a video.
2. FIG. 4B illustrates a plot with a histogram of motion vectors for X component and a line how it fitted with GMM.
3. FIG. 4C illustrates a plot with a histogram of motion vectors differences for X component and two lines: fitting with GMM and single Gaussian.

DETAILED DESCRIPTION OF THE EMBODIMENTS

Decoding

Figure 5:
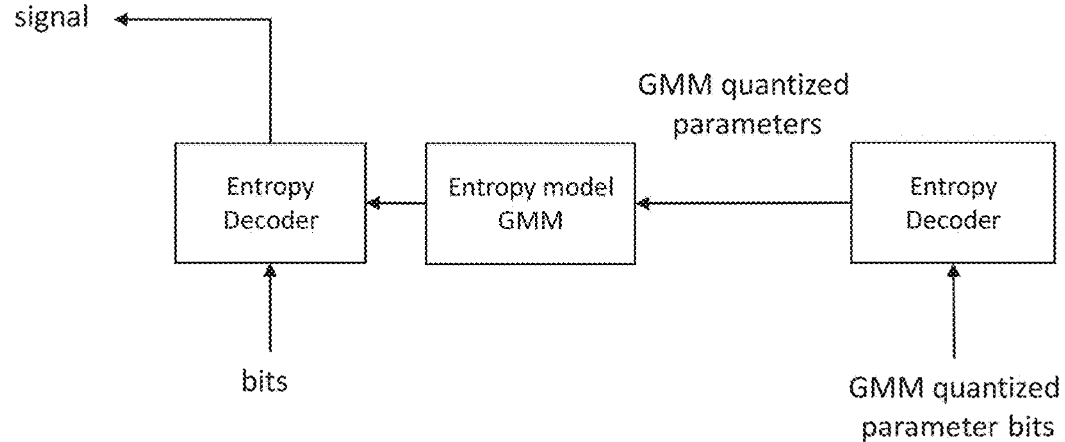
FIG. 5 illustrates the operation of a decoder in a block diagram.

FIG. 1 illustrates a general method of decoding an encoded signal according to an embodiment. The method comprises the steps of:

110: receiving at least one bitstream comprising an entropy encoded signal, the signal being entropy encoded with one or more Gaussian mixture model (GMM), and the at least one bitstream comprising information for obtaining parameters of the one or more GMMs;

120: obtaining the GMM parameters based on the information from the at least one bitstream; and

130: entropy decoding the signal using the GMMs with the obtained GMM parameters.

FIG. 3 illustrates respective examples for Gaussian distribution functions (upper part) and corresponding cumulative Gaussian distribution functions (lower part).

A mixture model is a probabilistic model for representing the presence of subpopulations within an overall population, without requiring that an observed data set should identify the sub-population to which an individual observation belongs. Formally a mixture model corresponds to the mixture distribution that represents the probability distribution of observations in the overall population. However, while problems associated with "mixture distributions" relate to deriving the properties of the overall population from those of the sub-populations, "mixture models" are used to make statistical inferences about the properties of the sub-populations given only observations on the pooled population, without sub-population identity information.

In case when base distributions are normal a mixture of them is called Gaussian Mixture Model (GMM). For GMM probability density function is:

$$f(x) = \sum_{k=1}^{K} \frac{w_k}{\sigma_k\sqrt{2\pi}} e^{-\frac{1}{2}\left(\frac{x-\mu_k}{\sigma_k}\right)^2}$$

with respective mean values $\mu_k$ and standard deviations $\sigma_k$. The GMM cumulative distribution function is:

$$F(x) = \sum_{k=1}^{K} \frac{w_k}{\sigma_k\sqrt{2\pi}} \int_{-\infty}^{x} e^{-\frac{1}{2}\left(\frac{z-\mu_k}{\sigma_k}\right)^2} dz$$

The parameter K>1 defines number of mixture components. The parameters $0 \leq w_1, \ldots w_K \leq 1$, $$\Sigma_{k=1}^{K} w_k = 1$$

define weights of the components in the mixture.

A shown in the example of FIG. 4, the Gaussian mixture model may be advantageous to be adapted to motion vectors or motion vector differences. The image at the top has essentially three objects moving in the directions of the respective arrows. The diagram in the middle shows a histogram of the x-components of the motion vectors (MV_x) and a corresponding GMM curve. The lower diagram shows a plot of a histogram of motion vector differences (MVD_x) and the corresponding GMM curve. The diagram also includes a single MLE estimated Gaussian (broad curve), which cannot fit the distribution histogram a well as the GMM (spiky curve).

Decoder

In a first embodiment, a decoder performs the following steps: 1) the step of parsing from the bitstream syntax elements defining procedure of parameters parsing and processing, their mapping with signal's channels, their value limits and total number of parameters, 2) the step of parsing and processing parameters according to the defined procedure, 3) the step of building GMM entropy models with these parameters, 4) the step of entropy decoding signal's channels with built entropy model with corresponding parameters.

In the following an exemplary decoder algorithm and syntax elements description is described:

1. A decoder reads from the bitstream parsing and processing control parameters:
   - parameter gmm_mode specifies relation between number of channels and number of GMMs:
     - gmm_mode==0 means number of channels and number of GMMs are equal: gmm_num=channels_num,
     - gmm_mode==1 means that all channels have only one GMM for entropy modelling and number of GMMs is equal 1: gmm_num=1,
     - gmm_mode==2 means that number of GMMs is signalled in the bitstream and parsed with function decode_gmm_num( ), using number of signal's channels (channels_num) as input parameter, the number of GMMs is coded as non-negative integer number using for signalling ceil ($\log_2$ channel_num)) bits thus gmm_num=decode_gmm_num (channels_num)
       - if gmm_mode==2, channel_gmm_map is read from the bitstream—it specifies mapping for each signal's channel with one of gmm_num GMMs and in exemplary implementation this mapping is represented as an array with channels_num elements and coded to the bitstream with entropy coding using equal probability frequency table.
   - for each GMM with index g in gmm_num GMMs:
     - scale_mu_coding_mode[g] is read from the bitstream with entropy coder using equal probability table for 3 possible values or as non-negative integer number using two bits for signalling. scale_mu_coding_mode[g] specifies a way of signalling scale factor for μ parameters for $g^{th}$ GMM:
       - scale_mu_coding_mode[g]==0 means that scale factor scale_mu[g] is defined with a predefined constant value, so it is not signalled in the bitstream and thus scale_mu[g]=predefined_scale_mu, where predefined_scale_mu is that predefined constant known on decoder side
       - scale_mu_coding_mode[g]==1 means that scale factor scale_mu[g] is signalled in the bitstream explicitly. It could be coded, for example, with entropy coder with equal probability frequency table, or with Exp-Golomb or as non-negative integer
       - scale_mu_coding_mode[g]==2 means that scale_pow_mu[g] is read from the bitstream and scale_mu[g]=$2^{scale\_pow\_mu[g]}$
     - mu_clipping_mode[g] is read from the bitstream with entropy coder using equal probability table for 3 possible values or as non-negative integer number using two bits for signalling. mu_clipping_mode[g] specifies a way of clipping u parameters values for $g^{th}$ GMM and thus values limits signalling in the bitstream:
       - mu_clipping_mode[g]==0 means that limiting values min_mu[g] and max_mu[g] are defined with predefined constant values, so they are not signalled in the bitstream and thus min_mu[g]=predefined_min_mu and max_mu[g]=predefined_max_mu, where predefined_min_mu and predefined_max_mu are those predefined constants known on decoder side
       - mu_clipping_mode[g]==1 means that limiting values min_mu[g] and max_mu[g] are signalled in the bitstream explicitly. They could be coded, for example, with entropy coder with equal probability frequency table, or with Exp-Golomb or just as non-negative integer
       - mu_clipping_mode[g]==2 means that clip_pow_mu[g] is read from the bitstream and limiting values are defined as min_mu[g]=$-2^{clip\_pow\_mu[g]}$, max_mu[g]=$2^{clip\_pow\_mu[g]}$
     - scale_sigma_coding_mode[g] is read from the bitstream with entropy coder using equal probability table for 3 possible values or as non-negative integer number using two bits for signalling. scale_sigma_coding_mode[g] specifies a way of signalling scale factor for σ parameters in $g^{th}$ GMM:
       - scale_sigma_coding_mode[g]==0 means that scale factor scale_sigma[g] is defined with a predefined constant value, so it is not signalled in the bitstream and thus scale_sigma[g]=predefined_scale_sigma, where predefined_scale_sigma is that predefined constant known on decoder side
       - scale_sigma_coding_mode[g]==1 means that scale factor scale_sigma[g] is signalled in the bitstream explicitly. It could be coded, for example, with entropy coder with equal probability frequency table, or with Exp-Golomb or as non-negative integer
       - scale_sigma_coding_mode[g]=2 means that scale_pow_sigma[g] is read from the bitstream and scale_sigma[g]=$2^{scale\_pow\_sigma[g]}$
     - sigma_clipping_mode[g] is read from the bitstream with entropy coder using equal probability table for 3 possible values or as non-negative integer number using two bits for signalling. sigma_clipping_mode[g] specifies a way of clipping σ parameters values for g GMM and thus values limits signalling in the bitstream, because of sigma values are supposed to be positive min_sigma[g] =predefined_min_sigma, where predefined_min_sigma is known on decoder side and usually is defined as 1, but sometimes it could be useful to have predefined minimum value to be 0 and use for describing signal with high peaks in density functions or even to be generalized for cases with the only possible value of signal or it could be more than 1 for some other reasons:

- sigma_clipping_mode[g]==0 means that limiting value max_sigma[g] is defined with predefined constant value, so it is not signalled in the bitstream and thus max_sigma[g]=predefined_max_sigma, where predefined_max_sigma is that predefined constant known on decoder side
- sigma_clipping_mode[g]==1 means that limiting value max_sigma[g] is signalled in the bitstream explicitly. It could be coded, for example, with entropy coder with equal probability frequency table, or with Exp-Golomb or as positive integer
- sigma_clipping_mode[g]==2 means that clip_pow_sigma[g] is read from the bitstream and limiting value are defined as max_sigma[g]= $2^{clip\_pow\_sigma[g]}$ cale_w_coding_mode [g] is read from the bitstream with entropy coder using equal probability table for 3 possible values or as non-negative integer number using two bits for signalling. scale_w_coding_mode[g] specifies a way of signalling scale factor for w parameters in $g^{th}$ GMM:

- scale_w_coding_mode[g]==0 means that scale factor scale_w[g] is defined with a predefined constant value, so it is not signalled in the bitstream and thus scale_w[g]=predefined_scale_w, where predefined_scale_w is that predefined constant known on decoder side
- scale_w_coding_mode[g]==1 means that scale factor scale_w[g] is signalled in the bitstream explicitly. It could be coded, for example, with entropy coder with equal probability frequency table, or with Exp-Golomb or as non-negative integer
- scale_w_coding_mode[g]==2 means that scale_pow_w[g] is read from the bitstream and scale_w[g]= $2^{scale\_pow\_w[g]}$
- It is not needed to signal clipping values for w because its values range is [0, 1]. So scaled parameters w[g] have range [0, scale_w[g]].

gaussian_num[g] is read from the bitstream with entropy coder using equal probability table, or with Exp-Golomb or as positive integer number, than decoder calculates parameters for $g^{th}$ GMM in a loop for each component with index n=0 . . . gaussian_num−1:

if (scale_mu_coding_mode<2): mu[g][n]=scaled_mu[g][n]/scale_mu[g] else: mu[g][n]=scaled_mu[g][n]>>scale_pow_mu[g]. scaled_mu[g][n] is denoting value read from the bitstream of $n^{th}$μ parameter in $g^{th}$ scaled on scale_mu[g] value before being quantized. Here shifting can be used for predefined codec values as well if it is set that it is equal to some power of 2. That's why we divide it on scale_mu[g] value after decoding or if scale_mu[g] is a power of 2, we shift it on scale_pow_mu[g] bits which is equal to $\log_2$(scale_mu[g]). scaled_mu[g][n] is decoded with arithmetic coder with equal probability symbols on range (min_mu[g], max_mu[g]) or with Exp-Golomb.

if (scale_sigma_coding_mode<2): sigma[g][n]= scaled_sigma[g][n]/scale_sigma[g] else: sigma[g][n] =scaled_sigma[g][n]>>scale_pow_sigma[g]. scaled_sigma[g][n] is denoting value read from the bitstream of $n^{th}$ σ parameter in $g^{th}$ scaled on scale_sigma[g] value before being quantized. That's why we divide it on scale_sigma[g] value after decoding or if scale_sigma[g] is a power of 2, we shift it on scale_pow_sigma[g] bits which is equal to $\log_2$(scale_sigma[g]). scaled_sigma[g][n] is decoded with arithmetic coder with equal probability symbols on range (min_sigma[g], max_sigma[g]) or with Exp-Golomb.

if n<gaussian_num−1:

if (scale_w_coding_mode<2): w[g][n]=scaled_w[g][n]/scale_w[g] else: w[g][n]=scaled_w[g][n]>>scale_pow_w[g]. scaled_w[g][n] is denoting value read from the bitstream of $n^{th}$μ parameter in $g^{th}$ scaled on scale_w[g] value before being quantized. That's why we divide it on scale_w[g] value after decoding or if scale_w[g] is a power of 2, we shift it on scale_pow_w[g] bits which is equal to $\log_2$(scale_w[g]). scaled_w[g][n] is decoded with arithmetic coder with equal probability symbols on range (min_w[g], max_w[g]) or with Exp-Golomb.

else: w[g][gaussian_num [g]−1]=1−sum (w[g], 0, gaussian_num [g]−2) because $$\Sigma_{n=0}^{gaussian\_num[g]-1} w_{g,n} = 1$$

and sum (A, b, e) here defines sum of elements of array A from index b to e, than decoder builds frequency tables frequency_table[g] for entropy models based on obtained parameters using build_gmm_frequency_table( ) function: frequency_table[g]=build_gmm frequency_table(mu[g], sigma[g], w[g]). For building it for each fold with length of quantization step QS in range from minimum −QS/2 to maximum +QS/2 of expected signal frequency value $$EcConst \cdot \mathrm{round}\Big(\sum_{n=0}^{gaussian_{num}-1} w_{g,n} \cdot (F(foldBegin + QS, \mu_{g,n}, \sigma_{g,n}) - F(foldBegin, \mu_{g,n}, \sigma_{g,n}))\Big)$$

is calculated, where EcConst defines value used by entropy coder for building frequencies to guarantee given precision of probabilities calculation, F(x, μ, σ) defines normal CDF function with u as mean parameter and σ>0 as standard deviation parameter. Than frequency table is clipped with 1 at lower bound to guarantee absence of zero-probability symbols.

2. A decoder iterates for each channel with index c in channels_num channels:

For each symbol of signal with index i in signal_num_elem elements:

signal[c][i] is entropy decoded from the bitstream using if (gmm_num==channels_num): frequency_table[c]; if (gmm_num==1): frequency_table [c]; else: frequency_table[channel_gmm_map [c]]

Below is an Exemplary Syntax Table of a Decoding Process:

| paramters_parsing( ) { | Descriptor |
|---|---|
| ... | |
| gmm_mode | u(2) or ep(3) |
| if( gmm_mode == 0 ) | |
| gmm_num = channels_num | |
| else if( gmm_mode == 1 ) | |
| gmm_num = 1 | |
| else | |
| { | |
| gmm_num = decode_gmm_num( channels_num ) | u( ceil( $\log_2$(channels_num) ) ) |
| for( c = 0; c < channels_num; c++ ) | |
| channel_gmm_map[ c ] | ep(channels_num) |
| } | |
| for ( g = 0; g < gmm_num; g++ ) | |
| { | |
| scale_mu_coding_mode[ g ] | u(2) or ep(3) |
| if (scale_mu_coding_mode[ g ] == 0 ) | |
| scale_mu[ g ] = predefined_scale_mu | |
| else if( scale_mu_coding_mode[ g ] == 1 ) | |
| scale_mu[ g ] | ep(v) or ue(v) or u(v) |
| else if( scale_mu_coding_mode[ g ] == 2 ) | |
| { | |
| scale_pow_mu[ g ] | ep(v) or ue(v) or u(v) |
| scale_mu[ g ] = $2^{scale\_pow\_mu[\ g\ ]}$ | |
| } | |
| mu_clipping_mode[ g ] | u(2) or ep(3) |
| if ( mu_clipping_mode[ g ] == 0 ) | |
| { | |
| min_mu[ g ] = predefined_min_mu | |
| max_mu[ g ] = predefined_max_mu | |
| } | |
| else if ( mu_clipping_mode[ g ] == 1 ) | |
| { | |
| min_mu[ g ] | ep(v) or ue(v) or u(v) |
| max_mu[ g ] | ep(v) or ue(v) or u(v) |
| } | |
| else if ( mu_clipping_mode[ g ] == 2 ) | |
| { | |
| clip_pow_mu[ g ] | ep(v) or ue(v) or u(v) |
| min_mu[ g ] = $-2^{clip\_pow\_mu[\ g\ ]}$ | |
| max_mu[ g ] = $2^{clip\_pow\_mu[\ g\ ]}$ | |
| } | |
| scale_sigma_coding_mode[ g ] | u(1) |
| if ( scale_sigma_coding_mode[ g ] == 0 ) | |
| scale_sigma[ g ] = predefined_scale_sigma | |
| else if ( scale_sigma_coding_mode[ g ] == 1 ) | |
| scale_sigma[ g ] | ep(v) or ue(v) or u(v) |
| else if ( scale_sigma_coding_mode[ g ] == 2 ) | |
| { | |
| scale_pow_sigma[ g ] | ep(v) or ue(v) or u(v) |
| scale_sigma[ g ] = $2^{scale\_pow\_sigma[\ g\ ]}$ | |
| } | |
| sigma_clipping_mode[ g ] | u(2) or ep(3) |
| min_sigma[ g ] = predefined_min_sigma | |
| if ( sigma_clipping_mode[ g ] == 0 ) | |
| max_sigma[ g ] = predefined_max_sigma | |
| else if ( sigma_clipping_mode[ g ] == 1 ) | |
| max_sigma[g ] | ep(v) or ue(v) or u(v) |
| else if ( sigma_clipping_mode[ g ] == 2 ) | |
| { | |
| clip_pow_sigma[ g ] | ep(v) or ue(v) or u(v) |
| max_sigma[ g ] = $2^{clip\_pow\_sigma[\ g\ ]}$ | |
| } | |
| scale_w_coding_mode[ g ] | u(1) |
| if ( scale_w_coding_mode[ g ] == 0 ) | |
| scale_w[ g ] = predefined_scale_w | |
| else if ( scale_w_coding_mode[ g ] == 1 ) | |
| scale_w[ g ] | ep(v) or ue(v) or u(v) |
| else if ( scale_w_coding_mode[ g ] == 2 ) | |
| { | |
| scale_pow_w[ g ] | ep(v) or ue(v) or u(v) |
| scale_w[ g ] = $2^{scale\_pow\_w[\ g\ ]}$ | |
| } | |
| gaussian_num[ g ] | ep(v) or ue(v) or u(v) |
| for( n = 0; n < gaussian_num[ g ]; n ++ ) | |

-continued

| paramters_parsing( ) { | Descriptor |
|---|---|
| { | |
| if( scale_mu_coding_mode < 2 ) | |
| mu[ g ][ n ] = scaled_mu[ g ][ n ] / scale_mu[ g ] | ep(min_mu[ g ], max_mu[ g ]) or ue(v) |
| else | |
| mu[ g ][ n ] = scaled_mu[ g ][ n ] >> scale_pow_mu[ g ] | ep(min_mu[ g ], max_mu[ g ]) or ue(v) |
| if( scale_sigma_coding_mode < 2 ) | |
| sigma[ g ][ n ] = scaled_sigma[ g ][ n ] / scale_sigma[ g ] | ep(min_sigma[ g ], max_sigma[ g ]) or ue(v) |
| else | |
| sigma[ g ][ n ] = scaled_sigma[ g ][ n ] >> scale_pow_sigma[ g ] | ep(min_sigma[ g ], max_sigma[ g ]) or ue(v) |
| if ( n < gaussian_num[ g ] − 1 ) | |
| { | |
| if( scale_w_coding_mode < 2 ) | |
| w[ g ][ n ] = scaled_w[ g ][ n ] / scale_w[ g ] | ep(0, scale_w[ g ]) or ue(v) |
| else | |
| w[ g ][ n ] = scaled_w[ g ][ n ] >> scale_pow_w[ g ] | ep(0, scale_w[ g ]) or ue(v) |
| } | |
| else | |
| w[ g ][ gaussian_num[ g ] − 1 ] = 1 − sum(w[ g ], 0, gaussian_num[ g ] − 2) | |
| } | |
| frequency_table [ g ] = build_gmm_frequency_table( mu[ g ], sigma[ g ], w[ g ] ) | |
| frequency_table[ g ]._clip( min = 1 ) | |
| } | |
| if( gmm_num == channels_num ) | |
| for( c = 0; c < channels_num; c++ ) | |
| for ( i = 0; i < signal_num_elem; i++ ) | |
| signal[ c ][ i ] | ec(frequency_table [ c ]) |
| else if( gmm_num == 1 ) | |
| for( c = 0; c < channels_num; c++ ) | |
| for ( i = 0; i < signal_num_elem; i++ ) | |
| signal[ c ][ i ] | ec(frequency_table [ 0 ]) |
| else | |
| for( c = 0; c < channels_num; c++ ) | |
| for ( i = 0; i < signal_num_elem; i++ ) | |
| signal[ c ][ i ] | ec(frequency_table [channel_gmm_map[ c ]]) |
| ... | |

Summarized, the Decoding Process in this Embodiment can be Described as Follows:

Decode gmm_mode (0: one GMM for each channel, 1: one GMM for all channels, 2: G GMMs for all channels)

If gmm_mode==0: G (amount of GMMs)=M (number of channels)

If gmm_mode==1: G=1

If gmm_mode==2:

Decode G

Decode channels-mixtures mapping indices: each index (value from 0 to G−1) corresponds to one of G GMM entropy models Decode scale_mu_coding_mode_flag, mu_clipping_mode, scale_sigma_coding_mode_flag, sigma_clipping_mode, scale_w_coding_mode_flag Entropy decode GMMs parameters range information:

For μ:

If scale_mu_coding_mode_flag==0: $scale_\mu$=predefined_$scale_\mu$

If scale_mu_coding_mode_flag==1: decode $scale_\mu$

If mu_clipping_mode==0: nothing to decode, ($min_\mu$, $max_\mu$)=(predefined_$min_\mu$, predefined_$max_\mu$)

If mu_clipping_mode==1: decode ($min_\mu$, $max_\mu$)

If mu_clipping_mode==2: decode $pow_\mu$, ($min_\mu$, $max_\mu$)=($-2^{pow_\mu}$, $2^{pow_\mu}$), For σ:

If scale_sigma_coding_mode_flag 0: $scale_\sigma$=predefined_$scale_\sigma$

If scale_sigma_coding_mode_flag==1: decode $scale_\sigma$

If sigma_clipping_mode=0: nothing to decode, $max_\sigma$=predefined_$max_\sigma$ If sigma_clipping_mode=1: decode $max_\sigma$, If sigma_clipping_mode==2: decode $pow_\sigma$, $max_\sigma=2^{pow_\sigma}$ For w:

If scale_w_coding_mode_flag==0: $scale_w$=predefined_$scale_w$

If Scale_w_Coding_Mode_Flag==1: Decode $Scale_w$

Decode $N^1, \ldots, N^G$—numbers of gaussians for each GMM

For each GMM index in 0 . . . . G−1

Entropy decode GMM parameters:

Decode $$\mu_1^j, \ldots \mu_{N^j}^j,$$

—Gaussians' quantized means for j GMM. Symbols are in range ($min_\mu$, $max_\mu$).

Decode $$\sigma_1^j, \ldots, \sigma_{N^j}^j,$$

—Gaussians' quantized standard deviations for j GMM. Symbols are in range (1, $max_\sigma$)

Decode $$w_1^j, \ldots, w_{N^j-1}^j,$$

—Gaussians' quantized weights for j GMM. Symbols are in range (1, $2^{scale_w}$)

Divide parameters by power in power of their scale coefficients

Calculate $$w_{N^j}^j = 1 - w_1^j - w_2^j - \cdots - w_{N-1}^j$$

for each GMM

Build GMM frequency histograms for each channel (normalized with number needed by arithmetic coder) and clip it with 1 at lower bound to guarantee there is no zero-probability symbols to be coded Decode each signal channel with corresponding (from channels-mixtures map) GMM entropy model.

Figure 7:
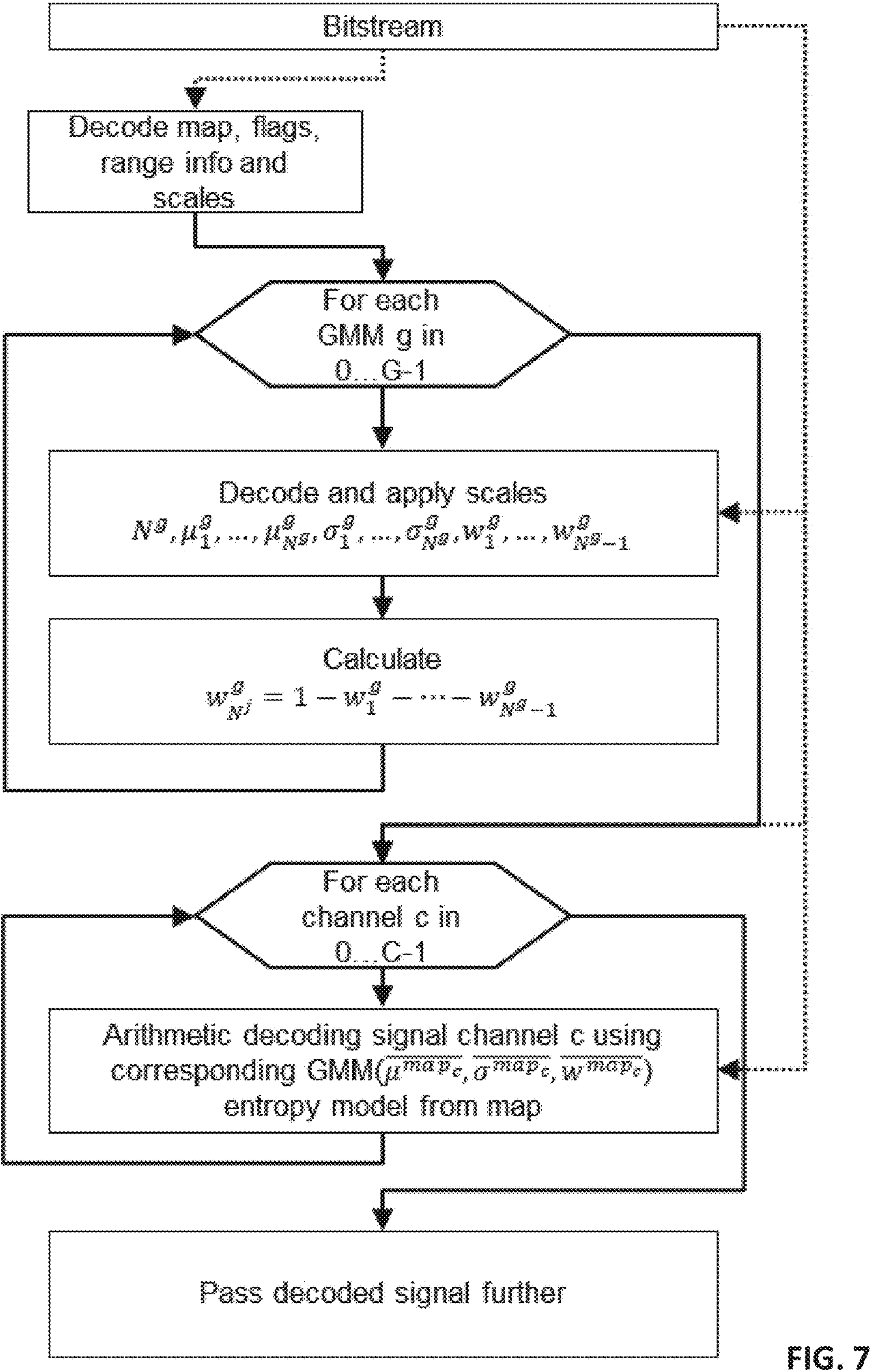
FIG. 7 illustrates the operation of a decoder in a flow diagram.

This is further illustrated also in FIGS. 5 and 7. FIG. 5 illustrates the operation of a decoder in a block diagram. FIG. 7 illustrates the operation of a decoder in a flow diagram.

Figure 9:
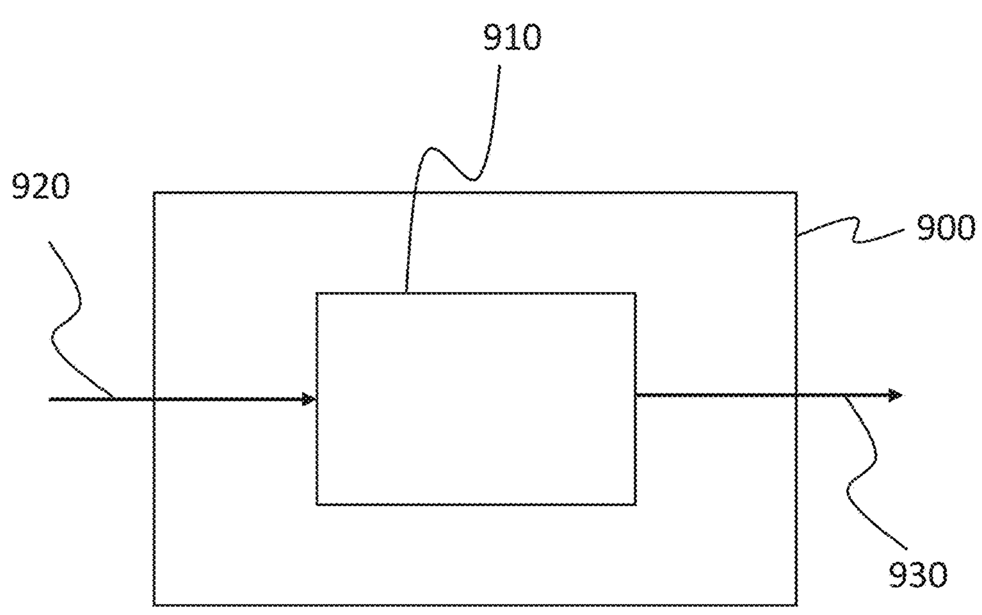
FIG. 9 illustrates a decoder with processing circuitry.

Furthermore, FIG. 9 illustrates a decoder with processing circuitry. The decoder 900 comprises processing circuitry 910 configured to perform the above described decoding methods. A bitstream 920 is processed to obtain the signal 930.

Encoding

FIG. 3 illustrates a general method of encoding a signal according to an embodiment. The method comprises the steps of:

210: entropy encoding a signal using one or more Gaussian mixture model (GMM) with determined GMM parameters; and

220: generating at least one bitstream comprising the entropy encoded signal and the determined GMM parameters.

GMM Parameters Optimization on Encoder Side

In a second embodiment a signal encoder comprises a GMM parameters optimization gradient decent algorithm, which may be performed in parallel (see below). An EM algorithm is not used because it is not needed to make clustering with matching data samples with classes but only fit distribution of the data, so all parameters are being optimized together in loop. As loss function analog of maximum likelihood estimation (MLE) is used, but instead of a density function, a difference of cumulative distribution functions (CDF) with distance of quantization step is used to be closer to entropy (e.g. quantized samples x and quantization step QS), so the loss function will be:

$$\text{loss}(\theta) = -\sum_{k=0}^{N-1} \log_2\left(F_\theta\left(x_k + \frac{QS}{2}\right) - F_\theta\left(x_k - \frac{QS}{2}\right)\right)$$

where F is a GMM CDF with parameters $\theta=(\vec{w}, \vec{\mu}, \vec{\sigma})$.

Parallelization of GMM Parameters Optimization on Encoder Side

In a third embodiment an optimization procedure of the second embodiment comprises an improvement of parallel optimization. The algorithm of optimization described in the second embodiment could be parallelized for different number of Gaussians in GMM. It is proposed to employ the fact that each loss for GMM with K Gaussians depends only on corresponding GMM parameters, so the other losses have 0 derivatives for current GMM. So, the sum of losses could be used as final loss for parallel optimization of batch of GMMs with different number of Gaussians.

For technical implementation it is proposed to present each group of parameters as matrix G×M, where G—is number of GMMs and M—is maximum number of Gaussians in GMMs. To avoid optimization of parameters in GMMs with Gaussians less than M it is proposed to optionally use a mask. In this mask each line has amount of ones equal to the corresponding GMM number of Gaussian.

So, the Final Loss Will be:

$$\text{Loss} = -\sum_{j=0}^{G-1}\sum_{k=0}^{N-1} \log_2\left(F_{\theta_j}\left(x_k + \frac{QS}{2}\right) - F_{\theta_j}\left(x_k - \frac{QS}{2}\right)\right)$$

After optimization for all GMMs' parameters is finished the best model j is chosen with minimum signaling cost:

$$\text{cost}_j = \text{loss}(\theta_j) + BitsForParametersSignalling(j)$$

Encoder

In a fourth embodiment an encoder performs the following steps: 1) the step of writing the bitstream syntax elements defining procedure of parameters parsing and processing, their mapping with signal's channels, their value limits and total number of parameters, 2) the step of processing and writing to the bitstream parameters according to the defined procedure, 3) the step of building GMM entropy models with these parameters (quantized and clipped, but not scaled), 4) the step of entropy encoding signal's channels with built entropy model with corresponding parameters.

Exemplary Encoder Algorithm and Syntax Elements Description:

1. An encoder writes into the bitstream parsing and processing control parameters:

parameter gmm_mode specifies relation between number of channels and number of GMMs:

gmm_mode==0 means number of channels and number of GMMs are equal: gmm_num=channels_num, gmm_mode==1 means that all channels have only one GMM for entropy modelling and number of GMMs is equal 1: gmm_num=1, gmm_mode==2 means that number of GMMs is signalled in the bitstream and written with function encode_gmm_num( ) using number of signal's channels (channels_num) as input parameter, the number of GMMs is coded as non-negative integer number using for signalling ceil (log 2 channel_num)) bits thus gmm_num=encode_gmm_num (channels_num)

- if gmm_mode==2, channel_gmm_map is written into the bitstream—it specifies mapping for each signal's channel with one of gmm_num GMMs and in exemplary implementation this mapping is represented as an array with channels_num elements and coded to the bitstream with entropy coding using equal probability frequency table.

for each GMM with index g in gmm_num GMMs:

- scale_mu_coding_mode[g] is written into the bitstream with entropy coder using equal probability table for 3 possible values or as non-negative integer number using two bits for signalling. scale_mu_coding_mode[g] specifies a way of signalling scale factor for μ parameters for $g^{th}$ GMM:
  - scale_mu_coding_mode[g]==0 means that scale factor scale_mu[g] is defined with a predefined constant value, so it is not signalled in the bitstream and thus scale_mu[g]=predefined_scale_mu, where predefined_scale_mu is that predefined constant known on decoder side
  - scale_mu_coding_mode[g]==1 means that scale factor scale_mu[g] is signalled in the bitstream explicitly. It could be coded, for example, with entropy coder with equal probability frequency table, or with Exp-Golomb or as non-negative integer
  - scale_mu_coding_mode[g]==2 means that scale_pow_mu[g] is written into the bitstream and scale_mu[g]=$2^{scale\_pow\_mu[g]}$
- mu_clipping_mode[g] is written into the bitstream with entropy coder using equal probability table for 3 possible values or as non-negative integer number using two bits for signalling. mu_clipping_mode[g] specifies a way of clipping μ parameters values for $g^{th}$ GMM and thus values limits signalling in the bitstream:
  - mu_clipping_mode[g]==0 means that limiting values min_mu[g] and max_mu[g] are defined with predefined constant values, so they are not signalled in the bitstream and thus min_mu[g]=predefined_min_mu and max_mu[g]=predefined_max_mu, where predefined_min_mu and predefined_max_mu are those predefined constants known on decoder side
  - mu_clipping_mode[g]==1 means that limiting values min_mu[g] and max_mu[g] are signalled in the bitstream explicitly. They could be coded, for example, with entropy coder with equal probability frequency table, or with Exp-Golomb or just as non-negative integer
  - mu_clipping_mode[g]==2 means that clip_pow_mu[g] is read from the bitstream and limiting values are defined as min_mu[g]=$-2^{clip\_pow\_mu[g]}$, max_mu[g]=$2^{clip\_pow\_mu[g]}$
- scale_sigma_coding_mode[g] is written into the bitstream with entropy coder using equal probability table for 3 possible values or as non-negative integer number using two bits for signalling. scale_sigma_coding_mode[g] specifies a way of signalling scale factor for σ parameters in $g^{th}$ GMM:
  - scale_sigma_coding_mode[g]==0 means that scale factor scale_sigma[g] is defined with a predefined constant value, so it is not signalled in the bitstream and thus scale_sigma[g]=predefined_scale_sigma, where predefined_scale_sigma is that predefined constant known on decoder side
  - scale_sigma_coding_mode[g]==1 means that scale factor scale_sigma[g] is signalled in the bitstream explicitly. It could be coded, for example, with entropy coder with equal probability frequency table, or with Exp-Golomb or as non-negative integer
  - scale_sigma_coding_mode[g]==2 means that scale_pow_sigma[g] is written into the bitstream and scale_sigma[g]=$2^{scale\_pow\_sigma[g]}$
- sigma_clipping_mode[g] is written into the bitstream with entropy coder using equal probability table for 3 possible values or as non-negative integer number using two bits for signalling. sigma_clipping_mode[g] specifies a way of clipping σ parameters values for g GMM and thus values limits signalling in the bitstream, because of sigma values are supposed to be positive min_sigma[g]=predefined_min_sigma, where predefined_min_sigma is known on decoder side and usually is defined as 1, but sometimes it could be useful to have predefined minimum value to be 0 and use for describing signal with high peaks in density functions or even to be generalized for cases with the only possible value of signal or it could be more than 1 for some other reasons:
  - sigma_clipping_mode[g]==0 means that limiting value max_sigma[g] is defined with predefined constant value, so it is not signalled in the bitstream and thus max_sigma[g]=predefined_max_sigma, where predefined_max_sigma is that predefined constant known on decoder side
  - sigma_clipping_mode[g]==1 means that limiting value max_sigma[g] is signalled in the bitstream explicitly. It could be coded, for example, with entropy coder with equal probability frequency table, or with Exp-Golomb or as positive integer
  - sigma_clipping_mode[g]==2 means that clip_pow_sigma[g] is written into the bitstream and limiting value are defined as max_sigma[g]=$2^{clip\_pow\_sigma[g]}$
- scale_w_coding_mode [g] is written into the bitstream with entropy coder using equal probability table for 3 possible values or as non-negative integer number using two bits for signalling. scale_w_coding_mode[g] specifies a way of signalling scale factor for w parameters in $g^{th}$ GMM:
  - scale_w_coding_mode[g]==0 means that scale factor scale_w[g] is defined with a predefined constant value, so it is not signalled in the bitstream and thus scale_w[g]=predefined_scale_w, where predefined_scale_w is that predefined constant known on decoder side
  - scale_w_coding_mode[g]==1 means that scale factor scale_w[g] is signalled in the bitstream explicitly. It could be coded, for example, with entropy coder with equal probability frequency table, or with Exp-Golomb or as non-negative integer
  - scale_w_coding_mode[g]==2 means that scale_pow_w[g] is written into the bitstream and scale_w[g]=$2^{scale\_pow\_w[g]}$ It is not needed to signal clipping values for w because its values range is [0, 1]. So scaled parameters w[g] have range [0, scale_w[g]].

gaussian_num [g] is written into the bitstream with entropy coder using equal probability table, or with Exp-Golomb or as positive integer number, calculating parameters for $g^{th}$ GMM in a loop for each component with index n=0 . . . gaussian_mim−1:

if (scale_mu_coding_mode<2): scaled_mu[g][n]=round (clip (mu[g][n], min_mu[g], max_mu[g])*scale_mu[g]); mu[g][n]=scaled_mu[g] [n]/scale_mu[g] else: scaled_mu[g][n]=round (clip (mu [g][n], min_mu[g], max_mu[g])<<scale_pow_mu [g]); mu[g][n]=scaled_mu[g][n]>>scale_pow_mu [g]. scaled_mu[g][n] is denoting written into the bitstream value of $n^{th}$ u parameter in $g^{th}$ scaled on scale_mu[g] value and quantized with clip (val, min, max) function. Here shifting can be used for predefined codec values as well if it is set that it is equal to some power of 2. That's why we multiply it on scale_mu[g] value before encoding or if scale_mu[g] is a power of 2, we shift it on scale_pow_mu[g] bits which is equal to $\log_2$(scale_mu[g]). scaled_mu[g][n] is encoded with arithmetic coder with equal probability symbols on range (min_mu[g], max_mu[g]) or with Exp-Golomb.

if (scale_sigma_coding_mode<2): scaled_sigma[g] [n]=round (clip (sigma[g] [n], min_sigma[g], max_sigma[g])*scale_sigma[g]); sigma[g][n]=scaled_sigma[g][n]/scale_sigma[g]. scaled_sigma[g][n] is denoting value written into the bitstream of $n^{th}$ σ parameter in $g^{th}$ scaled on scale_sigma[g] and quantized with clip (val, min, max) function. That's why we multiply it on scale_sigma[g] value before encoding or if scale_sigma[g] is a power of 2, we shift it on scale_pow_sigma[g] bits which is equal to $\log_2$(scale_sigma[g]). scaled_sigma[g][n] is encoded with arithmetic coder with equal probability symbols on range (min_sigma[g], max_sigma[g]) or with Exp-Golomb.

if n<gaussian_num−1:

if (scale_w_coding_mode<2): scaled_w[g][n]=round (clip (w[g][n], 0, 1)*scale_w[g]); w[g][n]=scaled_w[g][n]/scale_w[g]. scaled_w[g][n] is denoting value written into the bitstream of $n^{th}$ u parameter in $g^{th}$ scaled on scale_w[g] value before being quantized with clip (val, min, max). That's why we multiply it on scale_w[g] value before encoding or if scale_w[g] is a power of 2, we shift it on scale_pow_w[g] bits which is equal to $\log_2$ (scale_w[g]). scaled_w[g][n] is encoded with arithmetic coder with equal probability symbols on range (0, scale_w[g]) or with Exp-Golomb.

else: w[g][gaussian_num [g]−1]=1-sum (w[g], 0, gaussian_num [g]−2) because $$\sum_{n=0}^{gaussian\_num[g]-1} w_{g,n} = 1$$

and sum (A, b, e) here defines sum of elements of array A from index b to e, and building frequency tables frequency_table[g] for entropy models based on obtained parameters using build_gmm_frequency_table ( ) function: frequency_table[g]=build_gmm_frequency_table (mu[g], sigma[g], w[g]). For building it for each fold with length of quantization step QS in range from minimum-QS/2 to maximum +QS/2 of expected signal frequency value EcConst·round $$\left(\sum_{n=0}^{gaussian_{num}-1} w_{g,n} \cdot (F(foldBegin + QS, \mu_{g,n}, \sigma_{g,n}) - F(foldBegin, \mu_{g,n}, \sigma_{g,n}))\right)$$

is calculated, where EcConst defines value used by entropy coder for building frequencies to guarantee given precision of probabilities calculation, F(x, μ, σ) defines normal CDF function with μ as mean parameter and σ>0 as standard deviation parameter. Than frequency table is clipped with 1 at lower bound to guarantee absence of zero-probability symbols.

3. An encoder iterates for each channel with index c in channels_num channels:

For each symbol of signal with index i in signal_num_elem elements:

signal[c][i] is entropy encoded from the bitstream using if (gmm_num==channels_num): frequency_table[c]; if (gmm_num==1): frequency_table [c]; else: frequency_table[channel_gmm_map [c]]

Summarized, the Encoding Process in this Embodiment can be Described as Follows.

The incoming signal may have M channels. For all channels distribution approximation G GMMs are used. Three possible cases of G values depending on signaling are possible: each channel has its own GMM entropy model, one GMM for all channels, G GMMs for all channels (one GMM entropy model for $K^j$ channels $$\left(\sum_{j=I}^{G} K^j = M\right)$$

(beneficial effect: less parameters for transmission, G<M))

Signal GMM mode gmm_mode (0: one GMM for each channel, 1: one GMM for all channels, 2: G GMMs for all channels)

If gmm_mode==2:

Signal G-amount of GMMs

Signal channels-mixtures mapping indices: for each channel index corresponds to one of G GMM entropy models Signal flags in the bitstream:

scale_mu_coding_mode_flag (predetermined or signaled)

mu_clipping_mode (predetermined or maximum and minimum signaled or $pow_\mu$ signaled)

scale_sigma_coding_mode_flag (predetermined or signaled)

sigma_clipping_mode (predetermined or maximum and minimum signaled or pow, signaled)

scale_w_coding_mode_flag (predetermined or signaled) Entropy encode GMMs range parameters:

For μ:

If scale_mu_coding_mode_flag==0: nothing to encode, $scale_\mu$=predefined_$scale_\mu$ If scale_mu_coding_mode_flag==1: calculate $scale_\mu$, encode it to the bitstream If mu_clipping_mode==0: nothing to encode, ($min_\mu$, $max_\mu$)=(predefined_$min_\mu$, predefined_$max_\mu$)

If mu_clipping_mode=1: calculate ($min_\mu$, $max_\mu$), encode it to the bitstream If mu_clipping_mode==2: calculate $pow_\mu$, encode it to the bitstream ($min_\mu$, $max_\mu$)=($-2^{pow_\mu}$, $2^{pow_\mu}$), For σ:

If scale_sigma_coding_mode_flag==0: noting to encode, $scale_\sigma$=predefined_$scale_\sigma$ If scale_sigma_coding_mode_flag==1: calculate $scale_\sigma$, encode it to the bitstream If sigma_clipping_mode==0: nothing to encode, $max_\sigma$=predefined_$max_\sigma$ If sigma_clipping_mode==1: calculate $max_\sigma$, encode it to the bitstream If sigma_clipping_mode==2: calculate $pow_\sigma$, encode it to the bitstream, $max_\sigma=2^{pow_\sigma}$ For w:

If scale_w_coding_mode_flag==0: noting to encode, $scale_w$=predefined_$scale_w$ If Scale_w_Coding_Mode_Flag==1: Calculate $Scale_w$, Encode it to the Bitstream Entropy encode GMM parameters:

$N^1, \ldots, N^G$-numbers of gaussians for each channel are entropy coded for each GMM index j in 0 . . . . G−1:

$$\mu_1^j, \ldots, \mu_{N^j}^j,$$

—Gaussians' means for j GMM, multiplied by $2^{scale_\mu}$, rounded and clipped with ($min_\mu$, $max_\mu$) to ensure codability $$\mu_1^j, \ldots, \mu_{N^j}^j$$

are entropy coded. Symbols are in range ($min_\mu$, $max_\mu$)

$$\sigma_1^j, \ldots, \sigma_{N^j}^j,$$

—Gaussians' standard deviations for j GMM, multiplied on $2^{scale_\sigma}$, rounded and clipped with (1, $max_\sigma$) to ensure codability $$\sigma_1^j, \ldots, \sigma_{N^j}^j$$

are entropy coded. Symbols are in range (1, $max_\sigma$)

$$w_1^j, \ldots, w_{N^j-1}^j$$

—Gaussians' weights for j GMM, multiplied on $2^{scale_w}$ and rounded $$w_1^j, \ldots, w_{N^j-1}^j$$

are entropy coded. Symbols are in range (1, $2^{scale_w}$)

Weights $$w_{N^j}^j,$$

are not signaled in the bitstream

Figure 6:
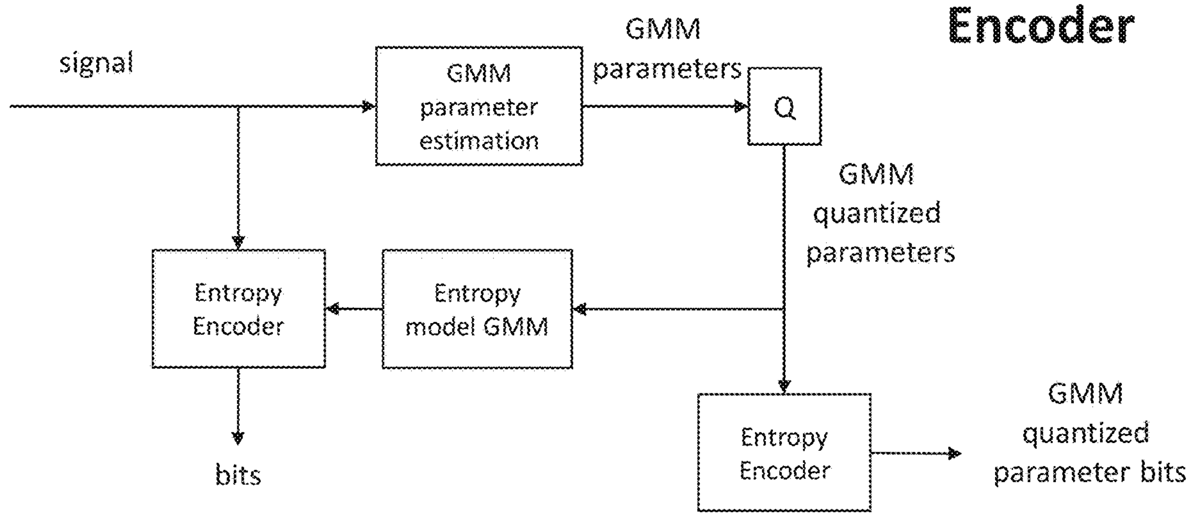
FIG. 6 illustrates the operation of an encoder in a block diagram.
Figure 8:
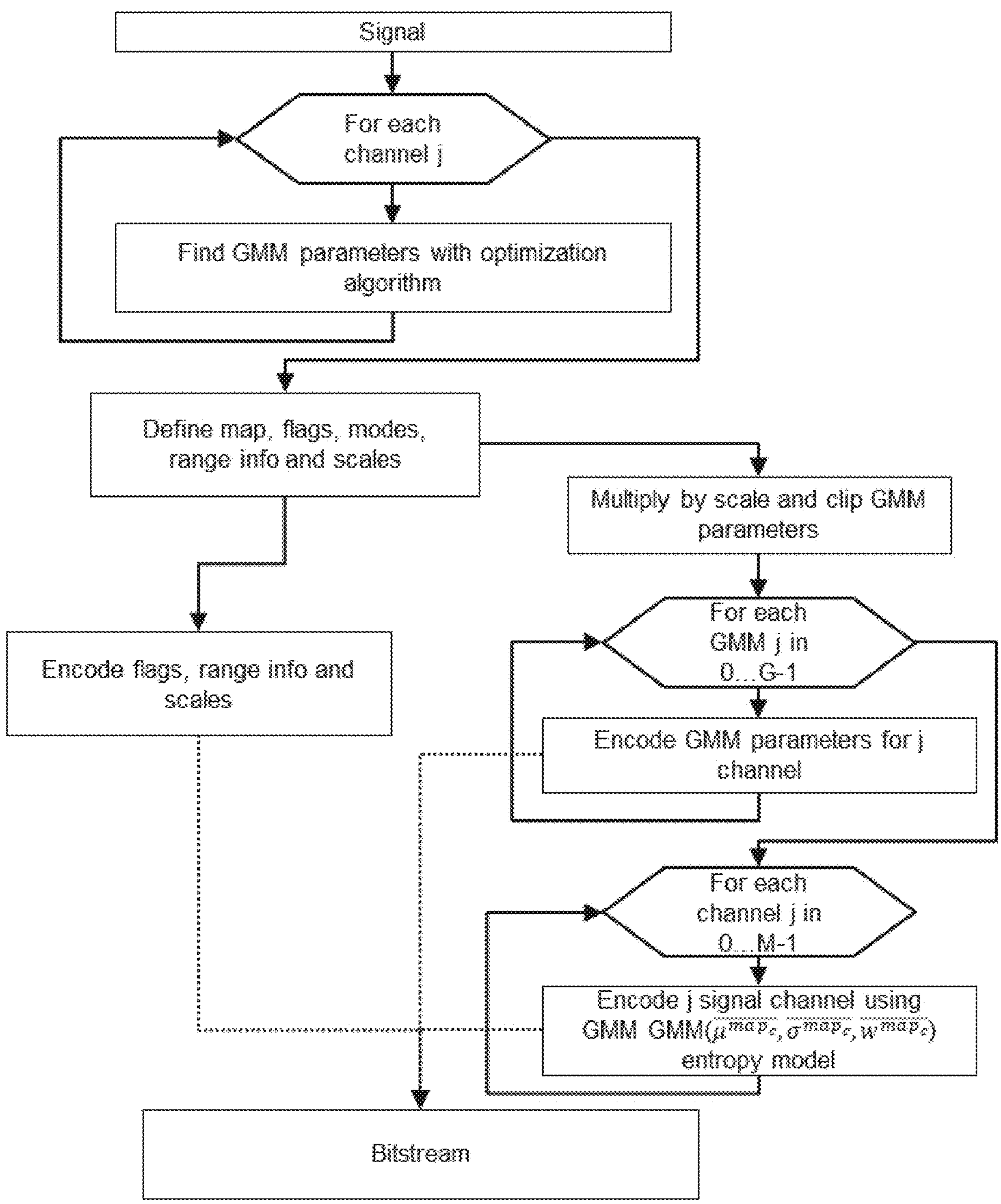
FIG. 8 illustrates the operation of an encoder in a flow diagram.

Build GMM frequency histograms for each channel (normalized with number needed by arithmetic coder) and clip it with 1 at lower bound to guarantee there is no zero-probability symbols to be coded GMM frequency histogram is clipped with 1 at lower bound to guarantee there is no zero-probability symbols to be coded Encode each signal channel with corresponding (from channels-mixtures map) GMM entropy model This is further illustrated also in FIGS. 6 and 8. FIG. 6 illustrates the operation of an encoder in a block diagram. FIG. 8 illustrates the operation of an encoder in a flow diagram.

Figure 10:
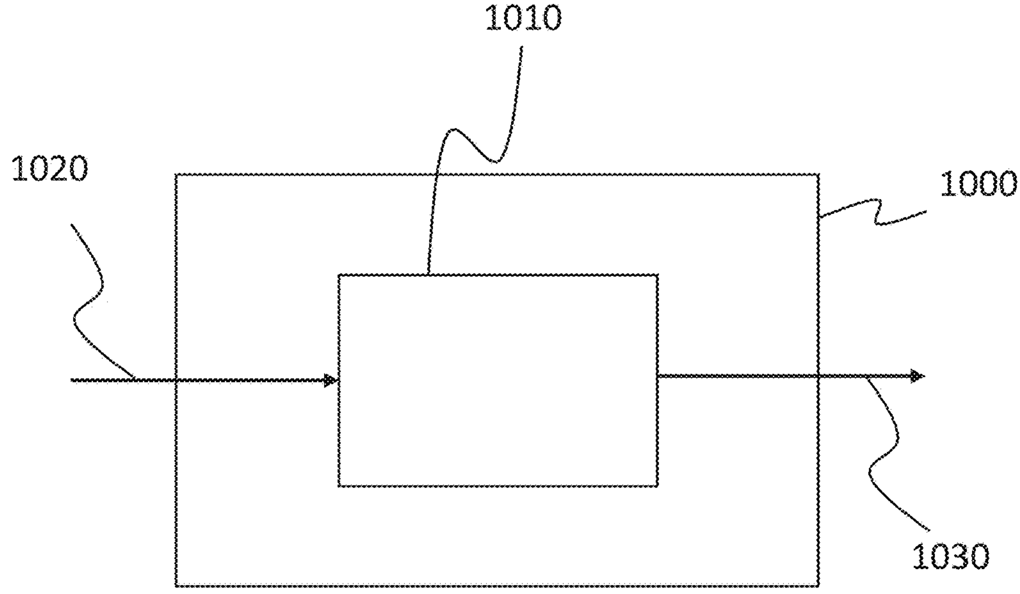
FIG. 10 illustrates an encoder with processing circuitry.

Furthermore, FIG. 10 illustrates an encoder with processing circuitry. The encoder 1000 comprises processing circuitry 1010 configured to perform the above described encoding methods. A signal 1020 is processed to obtain the bitstream 1030.

Data Privacy Protection

In the fifth embodiment it is proposed to use GMMs parameters for signal encryption (making the signal undecodable without a proper key). As signal couldn't be reconstructed without knowing GMM parameters, only GMM parameters can be encrypted and parameters for parsing and processing information may be signalled in the bitstream. That could help not to encrypt all the bitstream, but to encrypt only a small part of it and that would made a protection of all the bitstream that must speed-up the encrypting and decrypting processes. In another variant these parameters can be transmitted in a separate bitstream. That would make impossible to decode main bitstream without knowledge of GMM parameters.

Compression Benefit

The benefit of the above-described methods was also verified by testing as follows.

Testing results: MV coding with GMM over MV coding with scale hyperprior on JVET test set:

| | IPP GMM MV over Hyperprior MV coding | | | | | | |
|---|---|---|---|---|---|---|---|
| | Y | U | V | Ms-SSIM | EncT (sequential ) | (parallel ) EncT | DecT |
| Class A1 | −0.4% | 1.1% | 0.8% | −0.4% | 105% | 98% | 96% |
| Class A2 | 0.0% | 0.0% | 0.0% | −0.1% | 107% | 97% | 91% |

-continued

| | IPP GMM MV over Hyperprior MV coding | | | | | | |
|---|---|---|---|---|---|---|---|
| | Y | U | V | Ms-SSIM | EncT (sequential ) | (parallel ) EncT | DecT |
| Class B | −1.4% | −1.3% | −1.1% | −1.6% | 110% | 101% | 96% |
| Class C | −1.8% | −1.5% | −1.5% | −2.0% | 144% | 107% | 89% |
| Class E | −3.1% | −3.1% | −3.1% | −3.1% | 128% | 103% | 97% |
| Overall | −1.4% | −1.0% | −1.0% | −1.5% | 118% | 101% | 94% |
| Class D | −1.6% | −1.6% | −1.6% | −1.7% | 175% | 112% | 86% |
| Class F | −1.3% | −1.4% | −1.5% | −1.5% | 123% | 102% | 96% |

Result:

1. 1.4% of luma and 1% of chroma coding scale over scale HP
2. 6% decoder speedup
3. Due to possibility of parallelization encoder runtime doesn't increase Briefly summarized, the present disclosure provides a scheme of coding a signal using Gaussian mixture entropy model (fitted on Encoder side), with its parameters obtained from the bitstream on the Decoder side. The present disclosure further provides compression efficiency improvement using content adaptive entropy modelling with GMM and signalling its parameters explicitly in the bitstream. This approach allows to compress latent space data from latent space of CNN based image, video and audio codec or any other type of information that needs to be quantized and entropy compressed (e.g. motion vectors or motion vector difference). Another benefit is an increase in speed of the entropy decoding process, with no significant change in speed of encoding due to parallelization of the GMM entropy model parameters online optimization, which is important aspect for practical implementation. Moreover, this solution is not limited regarding adaptation to the content, which is due to adjustable model's parameters and their number.

What is claimed is:

1. A method of decoding an encoded signal, the method comprising:

receiving at least one bitstream comprising the encoded signal, the encoded signal being entropy encoded with one or more Gaussian mixture models (GMMs), and the at least one bitstream comprising information for obtaining GMM parameters of the one or more GMMs;

obtaining the GMM parameters of the one or more GMMs based on the information; and entropy decoding the encoded signal using the GMMs with the obtained GMM parameters, wherein each respective GMM of the one or more GMMs includes a plurality of Gaussians, and wherein obtaining the GMM parameters of each respective GMM comprises:

obtaining, for each respective Gaussian of the plurality of Gaussians of the respective GMM, one or more of: a respective mean value, a respective standard deviation, or a respective weight.

2. The method according to claim 1, wherein the obtaining the parameters of the one or more GMMs comprises:

obtaining, from the at least one bitstream, control information for one or more respective GMM parameters of the GMM parameters; and processing the control information to obtain the one or more respective GMM parameters.

3. The method according to claim 2, wherein the control information includes at least one of:

a GMM mode indicating a relation between channels and a number of GMMs;

a number of the one or more GMMs, one or more indices for mapping one or more channels to GMMs, one or more modes of signaling a scale factor for a GMM parameter, each mode of signaling being one of a first mode indicating use of a predefined value of the scale factor, a second mode indicating that the scale factor is to be entropy decoded from the bitstream, and a third mode indicating that an exponent for a power of 2 of the scale factor is to be decoded from the bitstream, one or more scaling coefficients for GMM parameters, one or more modes of signaling a clipping value for a GMM parameter, each mode being one of a first mode indicating use of a predefined value of the clipping value, a second mode indicating that the clipping value is to be entropy decoded from the bitstream, and a third mode indicating that an exponent for a power of 2 of the clipping value is to be decoded from the bitstream, one or more clipping values for GMM parameters, or a number of Gaussians for each GMM.

4. The method according to claim 1, further comprising building signal frequency tables based on the GMM parameters, wherein the entropy decoding the encoded signal comprises using the signal frequency tables for decoding the encoded signal.

5. The method according to claim 1, wherein the encoded signal includes one or more channels and the entropy decoding the encoded signal comprises entropy decoding each channel with a corresponding set of GMM parameters.

6. The method according to claim 1, wherein the at least one bitstream includes a first bitstream comprising the encoded signal and a second bitstream comprising the GMM parameters.

7. A method of encoding a signal, the method comprising:

entropy encoding the signal using one or more Gaussian mixture models (GMMs) with determined GMM parameters; and generating at least one bitstream comprising the entropy encoded signal and the determined GMM parameters, wherein each respective GMM of the one or more GMMs includes a plurality of Gaussians, and wherein obtaining the GMM parameters of each respective GMM comprises:

obtaining, for each respective Gaussian of the plurality of Gaussians of the respective GMM, one or more of: a respective mean value, a respective standard deviation, or a respective weight.

8. The method according to claim 7, further comprising setting control information for obtaining one or more of the determined GMM parameters, wherein the at least one bitstream comprises the control information.

9. The method according to claim 8, wherein the control information includes at least one of:

a GMM mode, indicating a relation between channels and a number of GMMs, a number of the one or more GMMs, one or more indices for mapping one or more channels to GMMs, one or more modes of signaling a scale factor for a GMM parameter, each mode of signaling being one of a first mode indicating use of a predefined value of the scale factor, a second mode indicating that the scale factor is to be entropy decoded from the bitstream, and a third mode indicating that an exponent for a power of 2 of the scale factor is to be decoded from the bitstream, one or more scaling coefficients for GMM parameters, one or more modes of signaling a clipping value for a GMM parameter, each mode being one of a first mode indicating use of a predefined value of the clipping value, a second mode indicating that the clipping value is to be entropy decoded from the bitstream, and a third mode indicating that an exponent for a power of 2 of the clipping value is to be decoded from the bitstream, one or more clipping values for GMM parameters, or a number of Gaussians for each GMM.

10. The method according to claim 7, wherein the signal includes one or more channels and the entropy encoding the signal comprises entropy encoding each channel with a corresponding set of GMM parameters.

11. The method according to claim 7, wherein the at least one bitstream includes a first bitstream comprising the entropy encoded signal and a second bitstream comprising the determined GMM parameters.

12. The method according to claim 7, further comprising:

performing an optimization algorithm using GMM cumulative distribution functions to obtain the determined GMM parameters, wherein the performing the optimization algorithm:

comprises minimizing a loss function based on differences of the GMM cumulative distribution functions at step size intervals for each GMM, or is done in parallel for respective GMMs of the one or more GMMs with respective different numbers of Gaussians; or wherein a respective GMM of the one or more GMMs having a minimum signaling cost with respect to required bits in the at least one bitstream is selected.

13. A decoder for decoding an encoded signal, the decoder comprising:

processing circuitry configured to perform the method of claim 1.

14. An encoder for encoding a signal, the encoder comprising:

processing circuitry configured to perform the method of claim 7.

15. A non-transitory computer readable medium having stored thereon processor-executable instructions that, when executed by a computer, cause the computer to carry out the method of decoding an encoded signal according to claim 1.

16. A non-transitory computer readable medium having stored thereon processor-executable instructions that, when executed by a computer, cause the computer to carry out the method of encoding a signal according to claim 7.

17. The method of claim 1, wherein the GMM parameters of each respective GMM comprise, for each respective Gaussian of the plurality of Gaussians of the respective GMM, the mean value, the standard deviation, and the weight, and wherein the weight defines a relative portion of the respective Gaussian in the GMM.

18. The method according to claim 2, wherein the control information includes:

a GMM mode indicating a relation between channels and a number of GMMs;

a number of the one or more GMMs, and a number of Gaussians for each GMM.

19. The method of claim 2, wherein the bitstream includes a plurality of signal channels, and wherein the control information provides, for each respective signal channel of the plurality of signal channels, a respective number of GMMs.

20. The method of claim 19, wherein the control information further provides, for each respective GMM of the respective number of GMMs, a number of Gaussian in the respective GMM.

21. A method of decoding an encoded signal, the method comprising:

receiving a bitstream comprising the encoded signal, the encoded signal being entropy encoded with one or more Gaussian mixture models (GMMs), and the bitstream comprising information for obtaining GMM parameters of the one or more GMMs;

obtaining the GMM parameters of the one or more GMMs based on the information; and entropy decoding the encoded signal using the GMMs with the obtained GMM parameters, wherein the obtaining the parameters of the one or more GMMs comprises:

obtaining, from the bitstream, control information for one or more respective GMM parameters of the GMM parameters; and processing the control information to obtain the one or more respective GMM parameters, wherein the bitstream includes a plurality of signal channels, and wherein the control information provides, for each respective signal channel of the plurality of signal channels, a respective number of GMMs.

22. The method of claim 21, wherein the control information further provides, for each respective GMM of the respective number of GMMs, a number of Gaussian in the respective GMM.

* * * * *